US011836871B2

(12) United States Patent
Dudrenov et al.

(10) Patent No.: US 11,836,871 B2
(45) Date of Patent: Dec. 5, 2023

(54) INDICATING A POSITION OF AN OCCLUDED PHYSICAL OBJECT

(71) Applicant: Apple Inc., Cupertino, CA (US)

(72) Inventors: Pavel Veselinov Dudrenov, San Francisco, CA (US); Edwin Iskandar, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/585,355

(22) Filed: Jan. 26, 2022

(65) Prior Publication Data

US 2022/0301267 A1 Sep. 22, 2022

Related U.S. Application Data

(60) Provisional application No. 63/164,048, filed on Mar. 22, 2021.

(51) Int. Cl.
*G06T 19/00* (2011.01)
*G06T 7/73* (2017.01)
(Continued)

(52) U.S. Cl.
CPC ............ *G06T 19/006* (2013.01); *G06F 3/013* (2013.01); *G06T 7/248* (2017.01); *G06T 7/74* (2017.01);
(Continued)

(58) Field of Classification Search
CPC ......... G06T 19/006; G06T 7/248; G06T 7/74; G06T 11/40; G06T 15/205; G06T 19/20;
(Continued)

(56) References Cited

U.S. PATENT DOCUMENTS 9,552,676 B2   1/2017 Wong et al.
10,068,369 B2  9/2018 James et al.
(Continued)

FOREIGN PATENT DOCUMENTS

JP   2003044868 A   2/2003
JP   2018-22292 A   2/2018
WO   2019144013 A1  7/2019

OTHER PUBLICATIONS

Extended European Search Report dated Sep. 9, 2022, European Patent Application No. 22158080.6, pp. 1-7.
(Continued)

*Primary Examiner* — Chong Wu
(74) *Attorney, Agent, or Firm* — Fernando & Partners, LLP

(57) ABSTRACT

A method is performed at an electronic device with one or more processors, a non-transitory memory, one or more environmental sensors, and a display. The method includes displaying computer-generated content on the display. The method includes determining a first positional value associated with a physical object, based on environmental data from the one or more environmental sensors. The method includes identifying a portion of the computer-generated content that satisfies an occlusion criterion with respect to a corresponding portion of the physical object, based on the first positional value. The method includes, in response to identifying that the occlusion criterion is satisfied, generating a mesh associated with the physical object based on the first positional value, and displaying the mesh on the display. The mesh overlaps with the portion of the computer-generated content.

20 Claims, 16 Drawing Sheets

(51) Int. Cl.
*G06T 7/246* (2017.01)
*G06F 3/01* (2006.01)
*G06T 11/40* (2006.01)
*G06T 15/20* (2011.01)
*G06T 19/20* (2011.01)

(52) U.S. Cl.
CPC ............ *G06T 11/40* (2013.01); *G06T 15/205* (2013.01); *G06T 19/20* (2013.01); *G06T 2215/12* (2013.01); *G06T 2215/16* (2013.01); *G06T 2219/2004* (2013.01)

(58) Field of Classification Search
CPC ............ G06T 2215/12; G06T 2215/16; G06T 2219/2004; G06T 2210/21; G06T 2210/62; G06T 2219/2021; G06T 2219/2024; G06F 3/013; G06F 1/1686; G06F 1/1694; G06F 3/017; G06F 3/0304; G06F 3/0346; G06F 3/011
See application file for complete search history.

(56) References Cited

U.S. PATENT DOCUMENTS

| | | |
|---|---|---|
| 10,186,087 B2 | 1/2019 | Davis et al. |
| 10,701,247 B1 | 6/2020 | Hossain |
| 10,755,486 B2 | 8/2020 | Baumbach et al. |
| 10,950,034 B1 | 3/2021 | Garcia et al. |
| 2005/0231532 A1 | 10/2005 | Suzuki et al. |
| 2017/0061696 A1 | 3/2017 | Li et al. |
| 2018/0040169 A1 | 2/2018 | Nakagawa |
| 2018/0045963 A1* | 2/2018 | Hoover .................. G06F 3/011 |
| 2019/0325661 A1 | 10/2019 | Baumbach et al. |
| 2020/0135141 A1 | 4/2020 | Day et al. |

OTHER PUBLICATIONS

Office Action for corresponding Japanese Appl. No. 2022-045469 dated Apr. 13, 2023.

* cited by examiner

INDICATING A POSITION OF AN OCCLUDED PHYSICAL OBJECT

CROSS-REFERENCE TO RELATED APPLICATIONS

This application claims priority to U.S. Provisional Patent App. No. 63/164,048 filed on Mar. 22, 2021, which is hereby incorporated by reference in its entirety.

TECHNICAL FIELD

The present disclosure relates to displaying content, and in particular, displaying an indicator associated with a physical object.

BACKGROUND

In some circumstances, a device displays, on a display, computer-generated content that occludes at least a first portion of a physical object. The physical object may be of interest to a user of the device. In the event the computer-generated content does not occlude a second portion of the physical object, the user may view the second portion on the display and thus notice the occlusion. Based on the user viewing the second portion, the user may reposition the computer-generated content or reposition the device in order to make more of the physical object viewable. However, the device utilizes computational resources in order to reposition the computer-generated content or reposition the device. Moreover, when the computer-generated content occludes the entirety of the physical object, the user experience is degraded because the user is wholly unaware of the presence of the physical object.

SUMMARY

In accordance with some implementations, a method is performed at an electronic device with one or more processors, a non-transitory memory, one or more environmental sensors, and a display. The method includes displaying computer-generated content on the display. The method includes determining a first positional value associated with a physical object, based on environmental data from the one or more environmental sensors. The method includes identifying a portion of the computer-generated content that satisfies an occlusion criterion with respect to a corresponding portion of the physical object, based on the first positional value. The method includes, in response to identifying that the occlusion criterion is satisfied, generating a mesh associated with the physical object based on the first positional value, and displaying the mesh on the display. The mesh overlaps with the portion of the computer-generated content.

In accordance with some implementations, an electronic device includes one or more processors, a non-transitory memory, one or more environmental sensors, and a display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
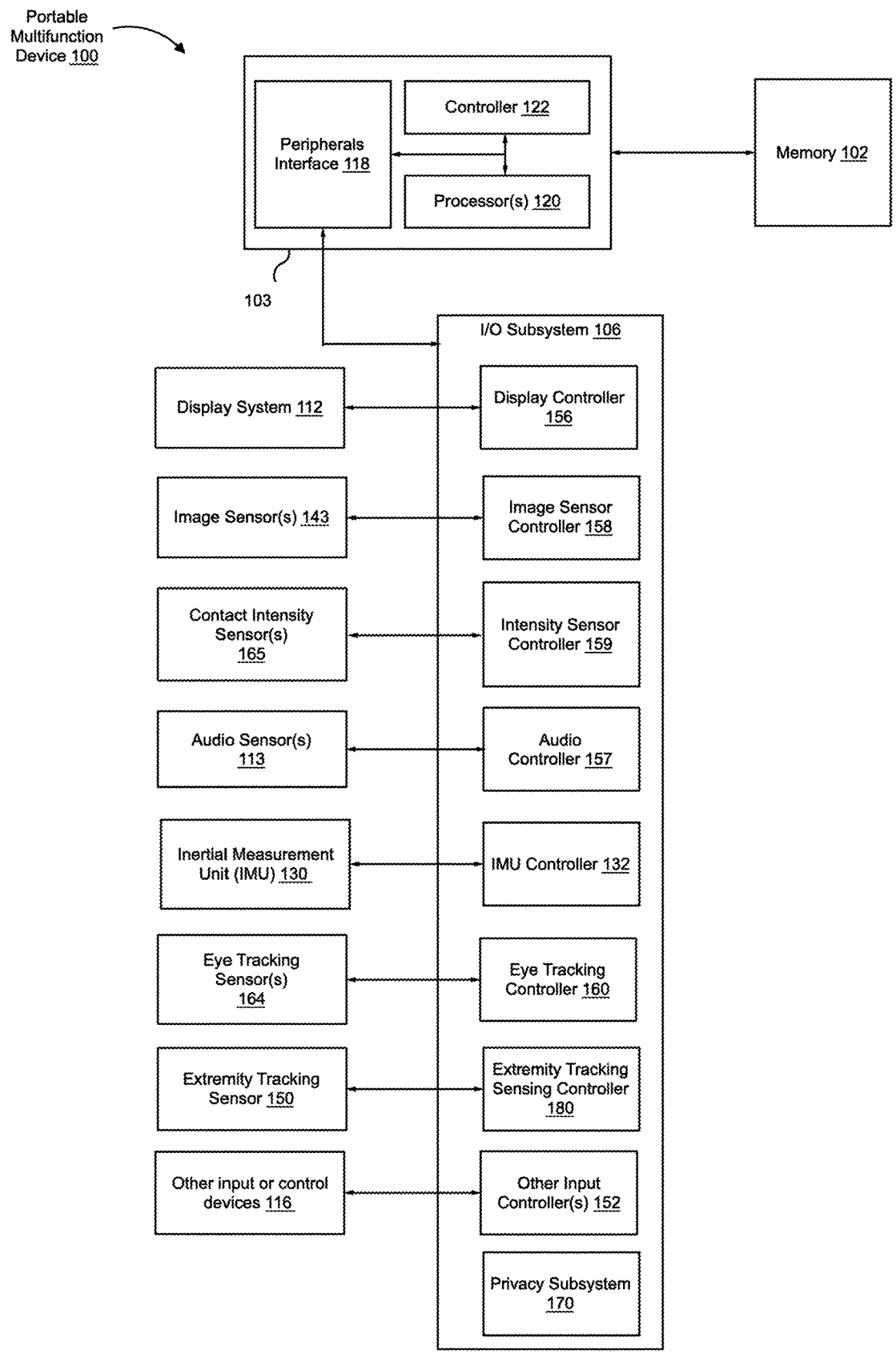
FIG. 1 is a block diagram of an example of a portable multifunction device in accordance with some implementations.

In some circumstances, a device displays, on a display, computer-generated content that occludes (e.g., blocks from view) at least a first portion of a physical (e.g., real-world) object. The physical object may be of interest to a user of the device. For example, the physical object is a physical agent, such as an individual walking through the user's physical environment. In the event the computer-generated content does not occlude a second portion of the physical object, the user may view the second portion on the display and thus notice the occlusion. Accordingly, the user may reposition the computer-generated content in order to make the more of the physical object viewable. For example, the user may dismiss (e.g., close) a menu interface or move a virtual display screen to a different location within an operating environment. The device utilizes computational resources in order to reposition the computer-generated content. Additionally or alternatively, the user may reposition the device (e.g., reposition or reorient the device with respect to a physical environment) so the device has an updated viewing region that includes more of the physical object. The device utilizes additional computational resources associated with obtaining and processing positional sensor data based on the repositioning of the device. Moreover, in the event the user the computer-generated content occludes the entirety of the physical object, the user experience is degraded because the user is wholly unaware of the presence of the physical object.

By contrast, various implementations include methods, systems, and electronic devices for displaying an object indicator that indicates a portion of a physical agent occluded by computer-generated content. To that end, an electronic device determines a plurality of positional values associated with the physical object based on a function of environmental data, such as a combination of image data, depth data, and ambient light data. While displaying the computer-generated content, the electronic device identifies a portion of the computer-generated content that that satisfies an occlusion criterion with respect to a corresponding portion of the physical object, based on the plurality of positional values. For example, the computer-generated content at least partially overlaps with the physical object on the display. As another example, the physical object is associated with one or more depth values that is greater than a first depth value associated with the computer-generated content. The electronic device displays an object indicator that indicates the corresponding portion of the physical object. The object indicator overlaps the portion of the computer-generated content. In some implementations, the electronic device displays the object indicator based on a semantic value that is associated with the physical object, such as when the semantic value indicates a physical agent (e.g., a person, animal, or robot) or a predefined (e.g., user-defined) object. For example, the electronic device includes an image sensor that captures image data representing the physical object, and the electronic device performs semantic segmentation with respect to image data in order to semantically identify a "person."

In some implementations, the electronic device generates a mesh associated with the physical object, based on the plurality of positional values, and the electronic device displays the mesh as the object indicator. For example, the mesh is a volumetric (e.g., three-dimensional (3D)) mesh based on depth value(s) associated with the physical object, wherein the depth value(s) are indicated within depth data from a depth sensor. In some implementations, the electronic device stores the mesh in a non-transitory memory (e.g., a buffer) of the electronic device. The electronic device may retrieve the mesh from the non-transitory memory in order to composite the mesh with a corresponding portion of the environmental data. In other words, the electronic device utilizes a common memory for storage of the mesh during mesh generation and for retrieval of the mesh during compositing. Accordingly, the electronic device composites the mesh with less latency and while using fewer computational resources, as compared with storing the mesh in a first memory during mesh generation, copying the mesh from the first memory to a second memory, and retrieving the mesh from the second memory during compositing.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (e.g., one or more non-transitory computer readable storage mediums), a memory controller 122, one or more processing units (CPUs) 120, a peripherals interface 118, an input/output (I/O) subsystem 106, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time-of-flight sensor that obtains depth information characterizing a physical object within a physical environment. In some implementations, the other input or control devices 116 include an ambient light sensor that senses ambient light from a physical environment and outputs corresponding ambient light data.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (sometimes referred to herein as "computer-generated content"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD. For example, the image sensor(s) 143 output image data that represents a physical object (e.g., a physical agent) within a physical environment.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect an eye gaze of a user of the electronic device 100 and generate eye tracking data indicative of a gaze position of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2A:
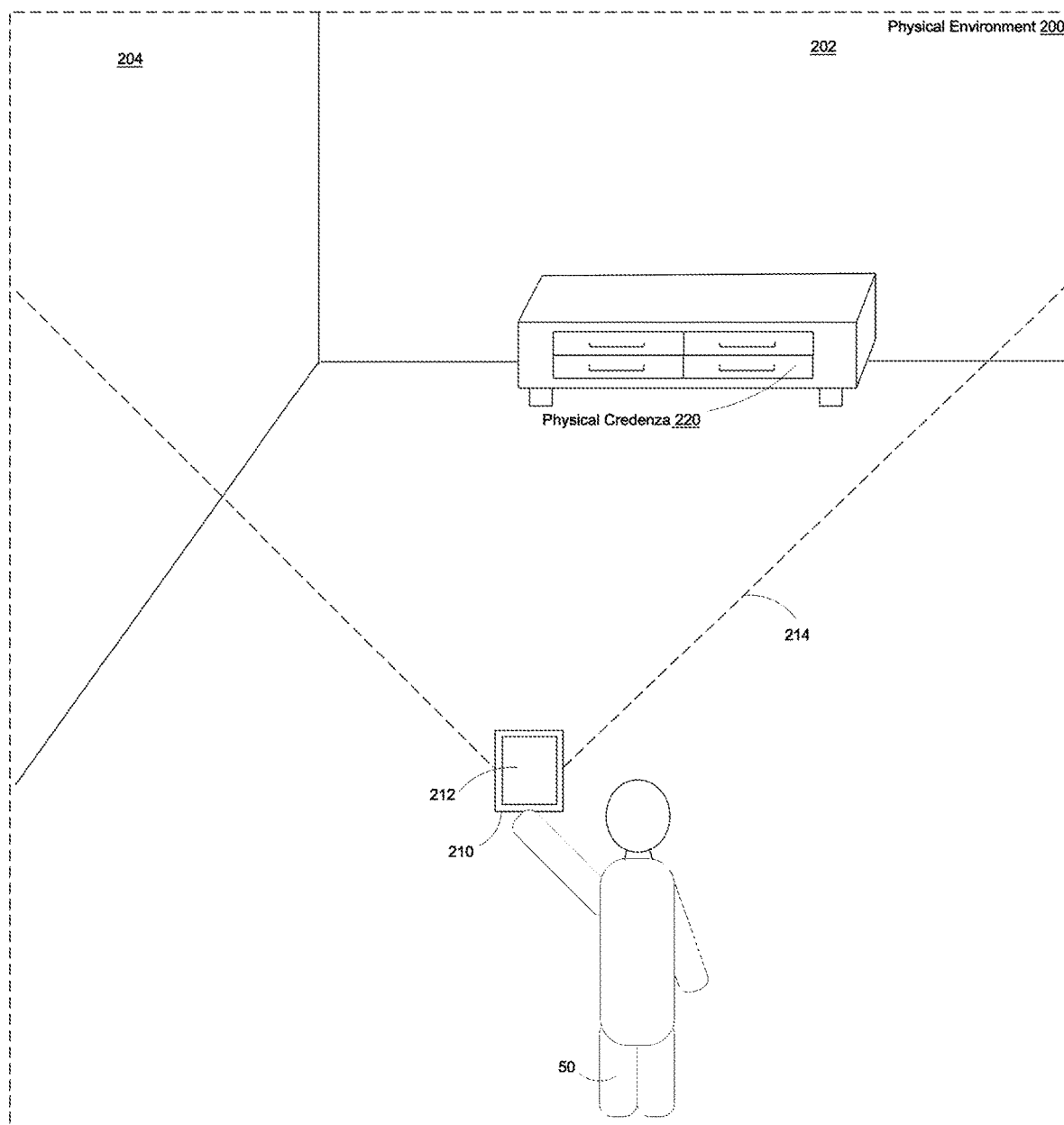
FIGS. 2A-2M are examples of an electronic device displaying an object indicator indicating an occluded portion of a physical object in accordance with some implementations.

FIGS. 2A-2M are examples of an electronic device 210 displaying an object indicator indicating an occluded portion of a physical object in accordance with some implementations. In various implementations, the electronic device 210 is similar to and adapted from the electronic device 100 illustrated in FIG. 1. The electronic device 210 is associated with (e.g., positioned within) a physical environment 200. The physical environment 200 includes a first wall 202, a second wall 204, and a physical credenza 220 that sits against the first wall 202. As illustrated in FIG. 2A, a user 50 is holding the electronic device 210, which is facing a portion of the physical environment 200.

The electronic device 210 includes a display 212. The display 212 is associated with a viewable region 214 that includes a portion of the physical environment 200. As illustrated in FIG. 2A, the viewable region 214 includes the physical credenza 220, a portion of the first wall 202, and a portion of the second wall 204. The viewable region 214 is a function of a position or orientation of the electronic device 210 relative to the physical environment 200.

In some implementations, the electronic device 210 corresponds to a mobile device including a display. For example, the electronic device 210 corresponds to a smartphone, tablet, or laptop. In some implementations, the electronic device 210 corresponds to a wearable device, such as a smartwatch or a head-mountable device (HMD) that includes an integrated display (e.g., a built-in display) for displaying a representation of the physical environment 200. In some implementations, the electronic device 210 includes a head-mountable enclosure. The head-mountable enclosure can include an attachment region to which another device with a display can be attached. The head-mountable enclosure can be shaped to form a receptacle for receiving another device that includes a display (e.g., the electronic device 210). For example, in some implementations, the electronic device 210 slides/snaps into or otherwise attaches to the head-mountable enclosure. In some implementations, the display of the device attached to the head-mountable enclosure presents (e.g., displays) the representation of the physical environment 200. For example, in some implementations, the electronic device 210 corresponds to a mobile phone that can be attached to the head-mountable enclosure.

The electronic device 210 includes one or more environmental sensors that output corresponding sensor data characterizing the physical environment 200. For example, in some implementations, the environmental sensor(s) include an image sensor, such as a scene camera. In some implementations, the image sensor obtains image data that characterizes the physical environment 200, and the electronic device 210 composites the image data with computer-generated content in order to generate display data for display on the display 212. The display data may be characterized by an XR environment.

In some implementations, the display 212 corresponds to a see-through display. The see-through display permits ambient light from the physical environment 200 to enter and be displayed by the see-through display. For example, the see-through display is a translucent display, such as glasses with optical see-through. In some implementations, the see-through display is an additive display that enables optical see-through of the physical environment 200, such as an optical HMD (OHMD). Unlike the implementations that includes compositing image data, the additive display is capable of reflecting projected images off of the display 212 while enabling the user to see through the display 212. The HMD may add computer-generated content to the ambient light entering the see-through display in order to enable display of the physical environment 200. In some implementations, the see-through display includes a photochromic lens.

Figure 2B:
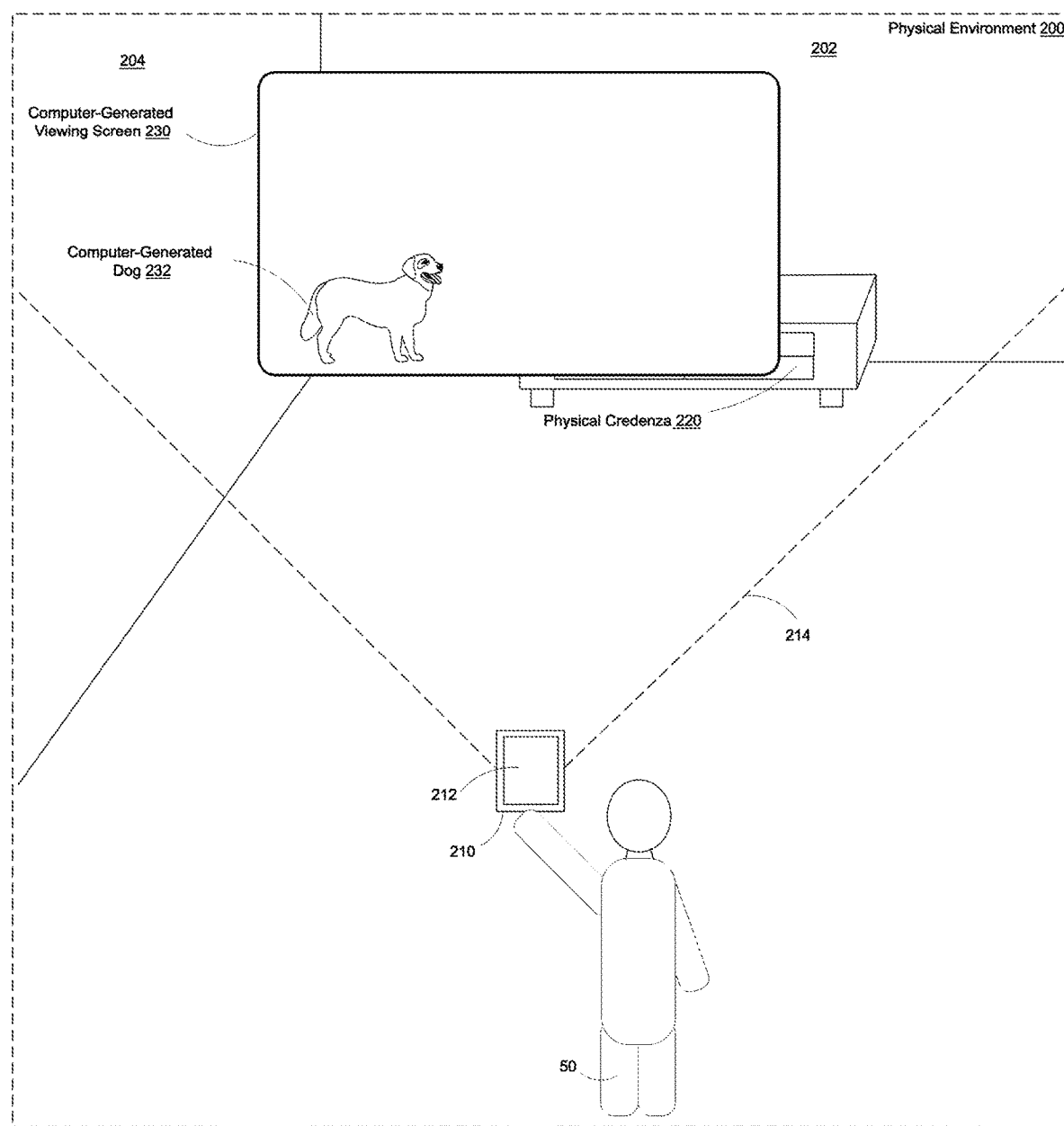

As illustrated in FIG. 2B, the electronic device 210 displays computer-generated content on the display 212. Namely, the computer-generated content includes a computer-generated viewing screen 230, which itself includes a computer-generated dog 232. One of ordinary skill in the art will appreciate that the computer-generated content may correspond to any type of content, such as a menu (e.g., a heads-up display (HUD)), three-dimensional (3D) content (e.g., a virtual couch), etc. In some implementations, the electronic device 210 stores and retrieves the computer-generated content from a local memory (e.g., a cache or RAM). In some implementations, the electronic device 210 obtains the computer-generated content from another system, such as by downloading the computer-generated content from a server.

Figure 2C:
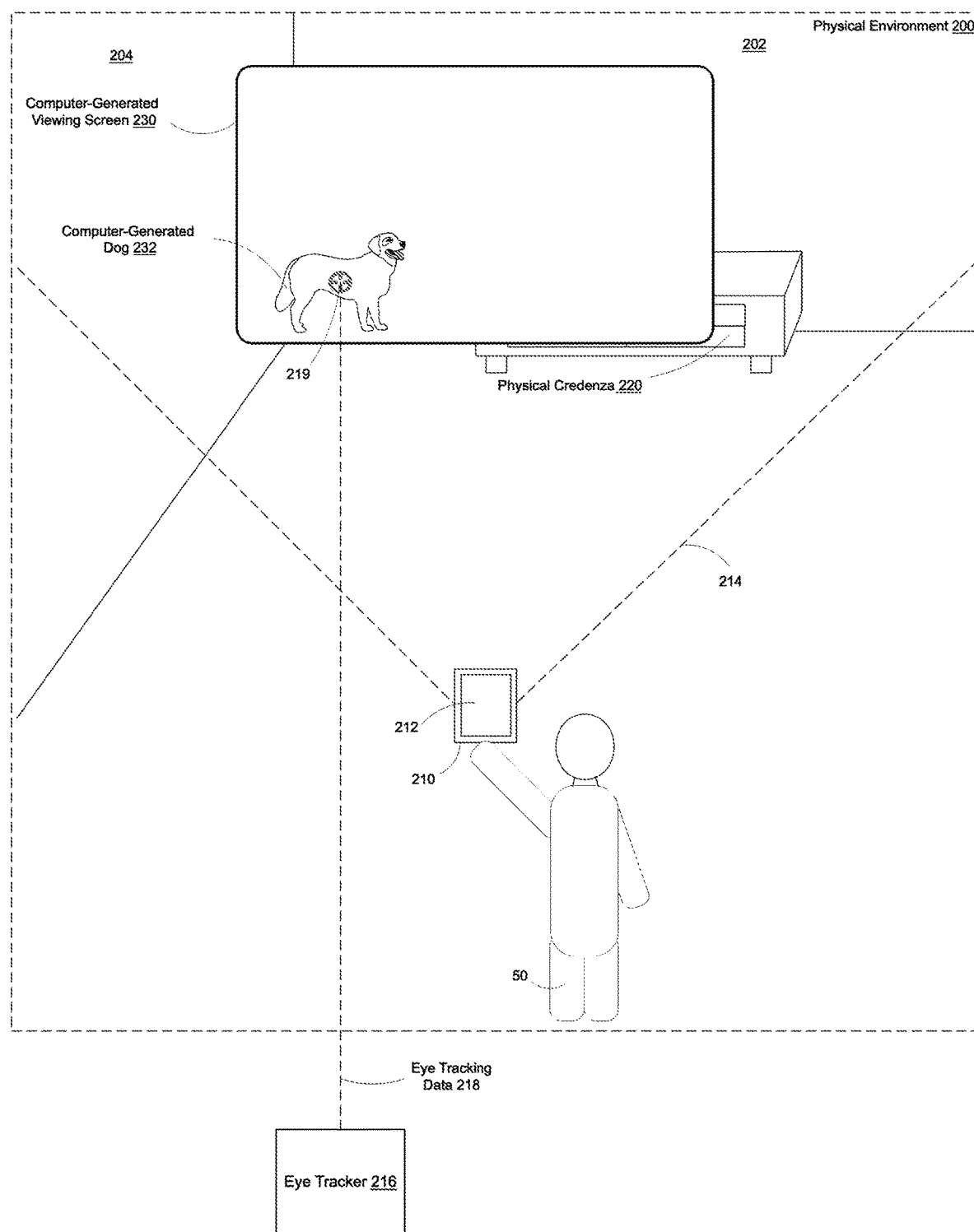

In some implementations, as illustrated in FIG. 2C, the electronic device 210 includes an eye tracker 216 that tracks an eye gaze of the user 50. To that end, the eye tracker 216 outputs eye tracking data 218 that indicates a gaze position of the user 50. The gaze position is directed to the computer-generated dog 232, as is indicated by a first reticle 219. Utilization of the gaze position in order to determine whether and how to display the object indicator is described below.

Figure 2D:
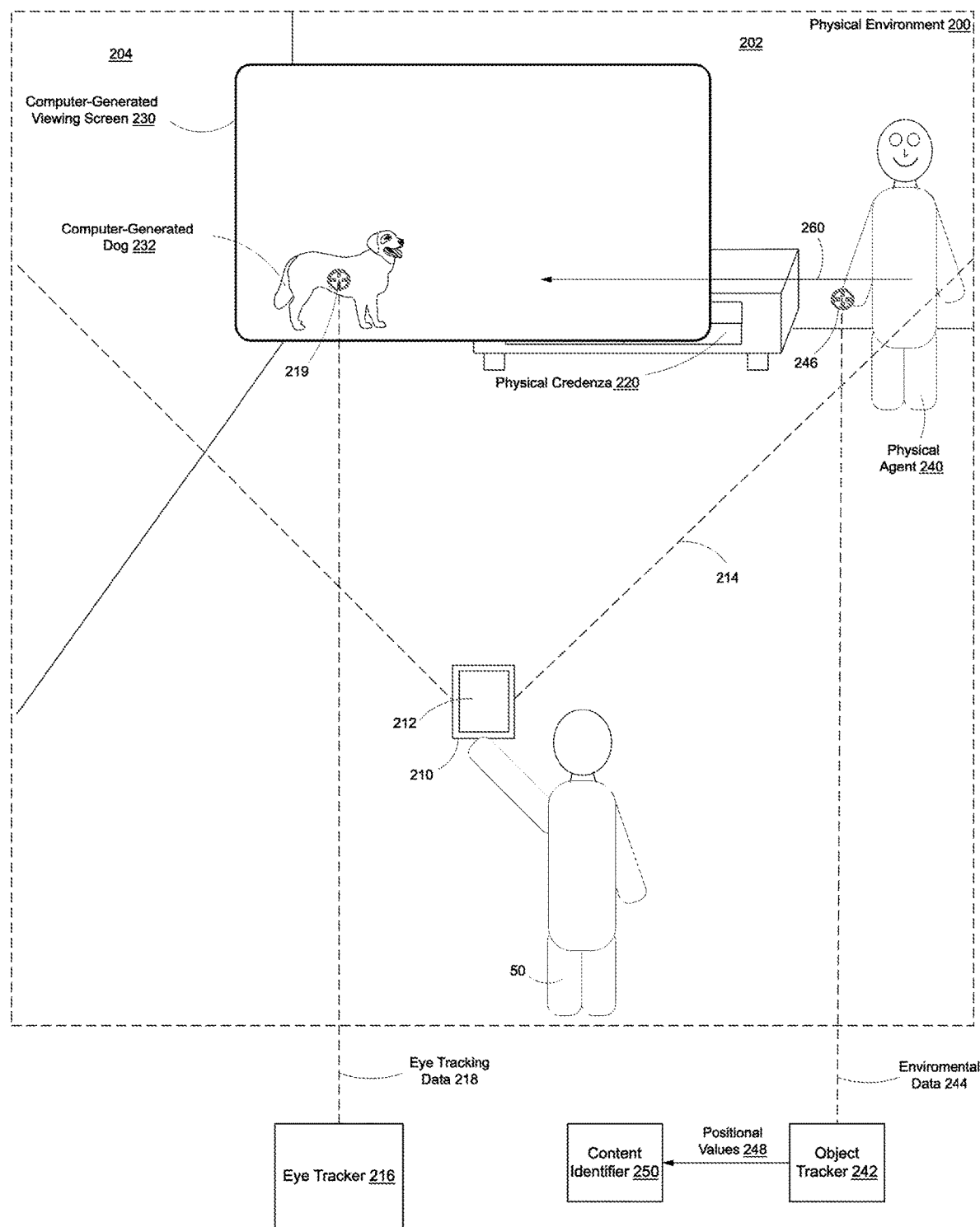

As illustrated in FIG. 2D, a physical agent 240 (e.g., an individual) moves within the physical environment 200, such as when the physical agent 240 enters a room in which the user 50 is located. Notably, a portion of the physical agent 240 is within the viewable region 214, enabling the electronic device 210 to detect the physical agent 240.

Based on environmental data 244, the electronic device 210 determines, via an object tracker 242, a plurality of positional values 248 associated with a physical object. The electronic device 210 includes one or more environmental sensors that output the environmental data 244. For example, the one or more environmental sensors include an image sensor that senses ambient light from the physical environment 200, and outputs corresponding image data representing the physical environment 200. The electronic device 210 may identify the plurality of positional values 248 based on the image data, such as via a computer-vision technique. For example, the electronic device 210 identifies a first pixel value corresponding to first portion of a physical object, and identifies a second pixel value corresponding to second portion of the physical object. In some implementation, the environmental data 244 includes a combination of image data and depth sensor data.

As another example, with reference to FIG. 2D, the plurality of positional values 248 are associated with the physical agent 240. The plurality of positional values 248 indicates a respective plurality of positions of the physical agent 240. For example, a first one of the plurality of positional values 248 indicates a first position of the right hand of the physical agent 240, wherein the first position is indicated by a second reticle 246 in FIG. 2D. Other positional values indicate other portions of the physical agent 240, such as the left hand, abdomen, legs, head, face, etc. Illustration of reticles associated with the other positional values are omitted from FIGS. 2D-2M for the sake of clarity and brevity. In some implementations, the electronic device 210 includes an image sensor that outputs image data representing the physical environment 200, and the object tracker 242 identifies (e.g., via a computer vision technique) a subset of pixels of the image data corresponding to the portion of the physical agent 240. For example, each of the subset of pixels corresponds to a respective one of the plurality of positional values 248. In some implementations, the object tracker 242 semantically identifies (e.g., via semantic segmentation) one or more portions of the physical agent 240 in order to determine one or more corresponding semantic values of "head," "left hand," "right hand", "face," etc. In some implementations, the electronic device 210 includes a depth sensor that outputs depth data associated with the portion of the physical agent 240, wherein the plurality of positional values 248 include one or more depth values indicated within the depth data. In some implementations, the electronic device 210 uses data from multiple distinct environmental sensors (e.g., image sensor, depth sensor, ambient light sensor) in order to determine the plurality of positional values 248.

The electronic device 210 includes a content identifier 250 that identifies a portion of the computer-generated content that satisfies an occlusion criterion with respect to a corresponding portion of a physical object, based on the plurality of positional values 248. For example, with reference to FIG. 2D, the content identifier 250 determines that the portion of the physical agent 240 and the computer-generated content do not overlap each other in FIG. 2D, and thus the occlusion criterion is not satisfied. In other words, the content identifier 250 does not yet identify any portion of the computer-generated content that satisfies the occlusion criterion. As further illustrated in FIG. 2D, as indicated by a first movement line 260, the physical agent 240 begins moving leftwards across the physical environment 200, in front of the physical credenza 220.

Figure 2E:
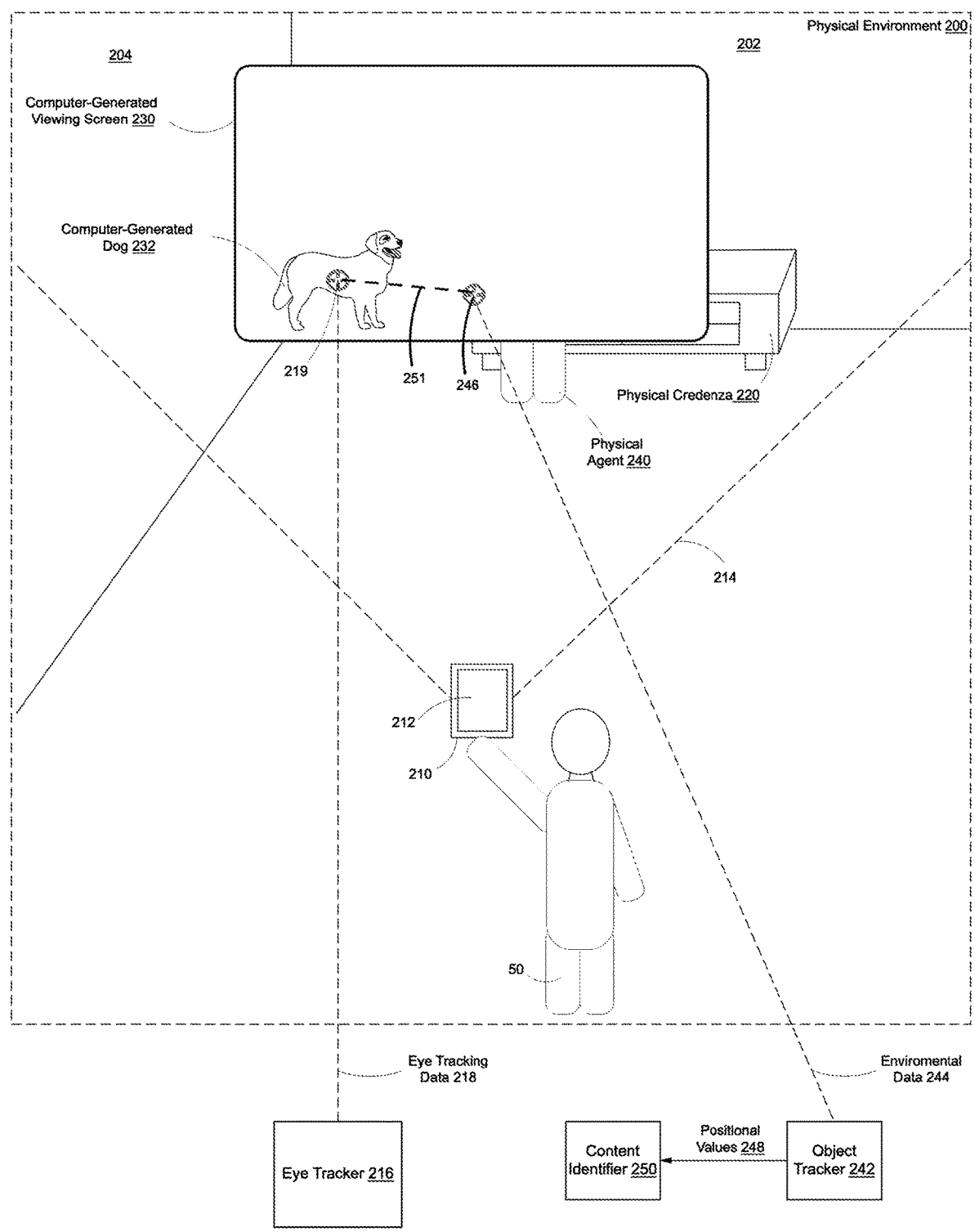

Based on the movement of the physical agent 240, as illustrated in FIG. 2E, the computer-generated viewing screen 230 occludes a corresponding portion (e.g., above the legs) of the physical agent 240. Accordingly, the corresponding portion of the physical agent 240 is not displayed. Based on an updated plurality of positional values 248 (as indicated by the second reticle 246 in FIG. 2E), the content identifier 250 identifies a portion of the computer-generated content that satisfies the occlusion criterion with respect to the corresponding portion of the physical agent 240. To that end, in some implementations, the content identifier 250 identifies an overlapping region in which the portion of the computer-generated content overlaps with the corresponding portion of the physical agent 240, as represented within the image data. The content identifier 250 identifies the overlapping region as the portion of the computer-generated content that satisfies the occlusion criterion. In some implementations, the content identifier 250 determines that the portion of the computer-generated content satisfies the occlusion criterion when more than a threshold number of pixels of the computer-generated content overlap with the corresponding portion of the physical agent 240. As another example, in some implementations, in combination with identifying the overlapping region based on the image data, the content identifier 250 uses one or more depth values in order to determine whether the occlusion criterion is satisfied. Continuing with this example, the content identifier 250 determines that the overlapping portion of the computer-generated content satisfies the occlusion criterion because the one or more depth values is greater than a first depth value associated with the overlapping portion of the computer-generated content. Although a second portion (e.g., the legs) of the physical agent 240 is viewable below the computer-generated content in FIG. 2E, one of ordinary skill in the art will appreciate that, in some implementations, the physical agent 240 is wholly occluded, and the content identifier 250 identifies a portion of the computer-generated content that satisfies the occlusion criterion.

Moreover, as illustrated in FIG. 2E, a distance line 251 indicates a distance between the gaze position (indicated by the first reticle 219) and the tracked portion of the physical agent 240 (indicated by the second reticle 246). In some implementations, the electronic device 210 uses the distance in order to determine whether or not to display the object indicator, as is described below.

The electronic device 210 displays an object indicator that indicates the corresponding portion of the physical agent 240. The object indicator overlaps the portion of the computer-generated content that satisfies the occlusion criterion. By displaying the object indicator, the electronic device 210 provides an indicator to the user 50 regarding the position of the occluded portion of the physical agent 240. Accordingly, the user experience is enhanced, and the electronic device 210 saves computational (e.g., processor and sensor) resources because the user 50 need not reposition the computer-generated content or the electronic device 210 in order to make the occluded portion of the physical agent 240 viewable. According to various implementations, the object indicator may be displayed in various ways.

Figure 2F:
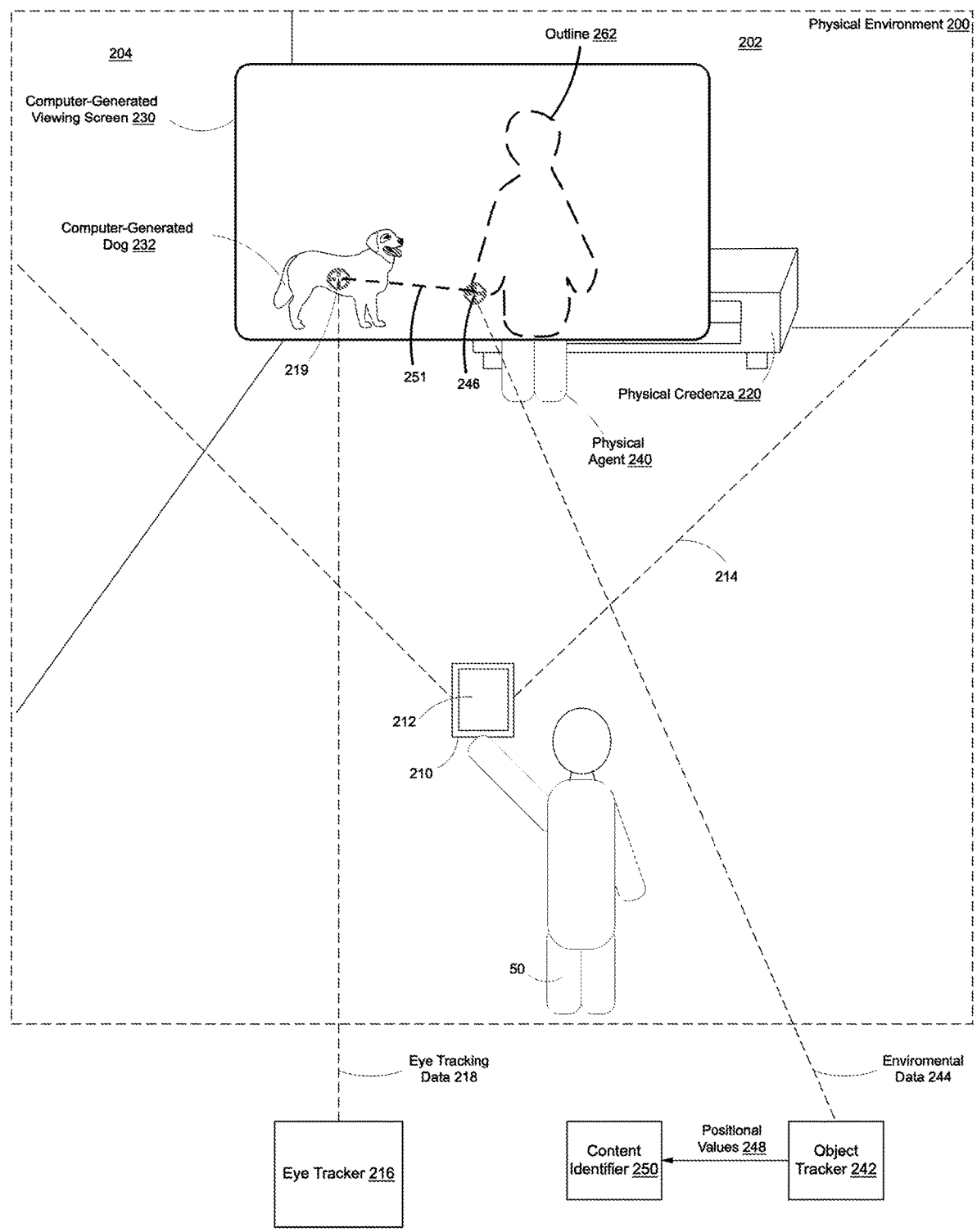

For example, as illustrated in FIG. 2F, the electronic device 210 displays, on the display 212, an outline 262 that corresponds to the object indicator. The outline 262 is overlaid on the corresponding portion of the physical agent 240. To that end, the electronic device 210 determines the outline 262 based on the plurality of positional values 248. For example, the outline 262 indicates an outer boundary (e.g., a silhouette) of the corresponding portion of the physical agent 240. In some implementations, the electronic device 210 composites the outline 262 with a portion of the environmental data 244 (e.g., subset of pixels of image data) that is associated with the corresponding portion of the physical agent 240.

Figure 2G:
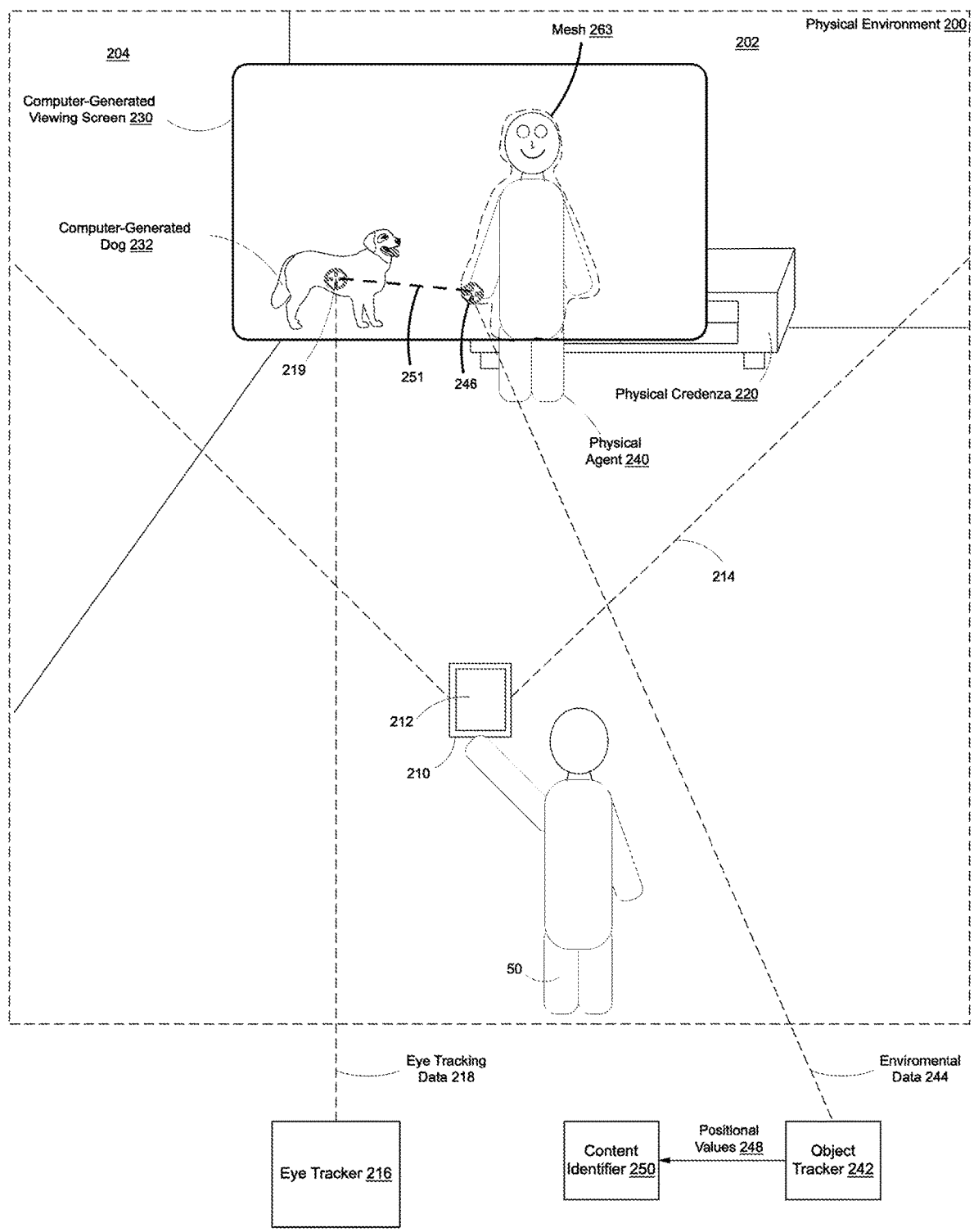

According to various implementations, the object indicator corresponds to a mesh that is associated with the physical agent 240. The mesh may have a variety of textures. In some implementations, a texture of the mesh enables the user 50 to partially or wholly view the physical agent 240 through the computer-generated viewing screen 230. For example, with reference to FIG. 2G, the electronic device 210 generates and displays a mesh 263 that is slightly larger than the outer boundary of the physical agent 240. The electronic device 210 generates the mesh 263 based on at least a portion of the plurality of positional values 248. The mesh 263 may include an elongated bubble, indicated by the dotted line outline in FIG. 2G. The mesh 263, when composited with a corresponding portion of the computer-generated viewing screen 230, makes the physical agent 240 viewable on the display 212, as illustrated in FIG. 2G. In other words, the mesh 263 enables a breakthrough of the corresponding portion of the computer-generated viewing screen 230 so that the user 50 can see the real, physical representation of the physical agent 240 through the computer-generated viewing screen 230. In some implementations, electronic device 210 generates the mesh 263 in response to determining that the physical agent 240 is attempting to get the attention of the user 50, such as when the physical agent 240 is facing the user 50 and an arm of the physical agent 240 is waving at the user 50.

In some implementations, a mesh indicates a shadow that associated with the physical agent 240. For example, with reference to FIG. 2H, the electronic device 210 generates and displays a mesh 264 that indicates a shadow associated with the physical agent 240. In some implementations, the electronic device 210 generates the mesh 264 indicating the shadow (rather than breaking through—e.g., via the mesh 263) based on determining that the physical agent 240 is behind the computer-generated viewing screen 230 but is not attempting to get the attention of the user 50. For example, the physical agent 240 is facing away from the user 50, moving away from the user 50, and/or moving less than a threshold amount overall.

The mesh 264 is associated with the corresponding portion of the physical agent 240. The mesh 264 has a cross-hatch pattern in order to distinguish the mesh 264 from the background of the computer-generated viewing screen 230. In some implementations, the mesh 264 represents the corresponding portion of the physical agent 240 as a collection of discrete geometric and topological elements. The electronic device 210 generates the mesh 264 based on the plurality of positional values 248. The mesh 264 may be two-dimensional (2D), such as when the mesh 264 includes a combination of triangular and quadrilateral elements. For example, the electronic device 210 determines a 2D mesh based on image data that represents the corresponding portion of the physical agent 240.

The mesh 263 and/or the mesh 264 may be volumetric (e.g., three-dimensional (3D)), such as when the mesh includes a combination of tetrahedron, quadrilateral pyramid, triangular prism, and hexahedron elements. For example, the plurality of positional values 248 includes a plurality of depth values, and the electronic device 210 determines a volumetric mesh based on the plurality of depth values. In some implementations, the electronic device 210 determines a volumetric mesh based on point cloud data associated with the corresponding portion of the physical agent 240.

In some implementations, the electronic device 210 displays the object indicator in response to determining that the gaze position (indicated by the first reticle 219) satisfies a proximity threshold with respect to the portion of the computer-generated content. For example, with reference to FIGS. 2F and 2H, the electronic device 210 determines that the gaze position satisfies the proximity threshold because the distance between the gaze position and the portion of the physical agent 240 (indicated by the second reticle 246) is less than a threshold distance. Accordingly, the electronic device 210 displays the object indicator, such as the outline 262 in FIG. 2F or the mesh 264 in FIG. 2H. As a counter-example, with reference to FIG. 2M, the electronic device 210 ceases to display the object indicator (the mesh 264) because, as a result of the physical agent 240 moving away from the gaze position, the gaze position ceases to satisfy the proximity threshold—e.g., the gaze position is more than the threshold distance away from the physical agent 240.

Figure 2H:
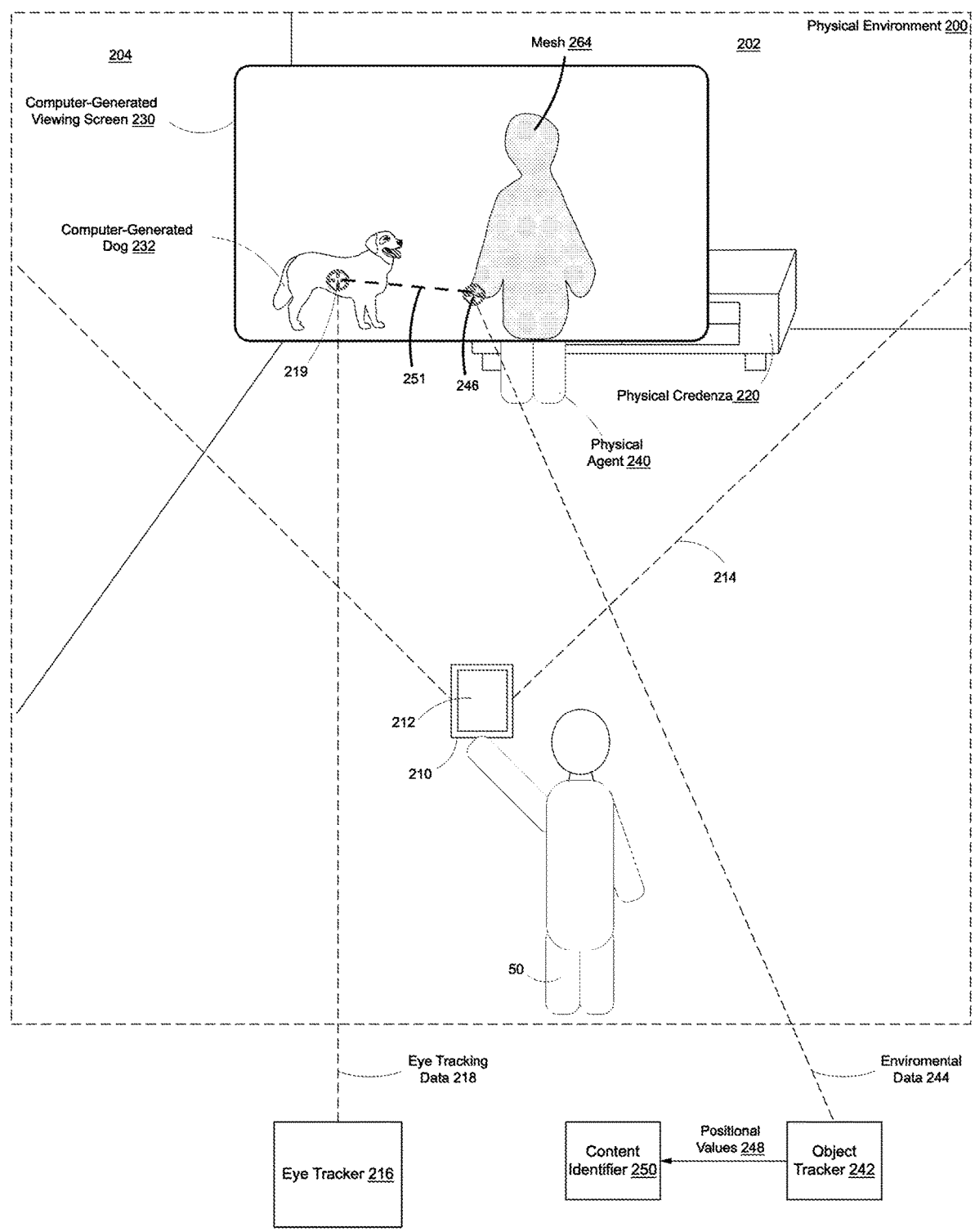
Figure 2I:
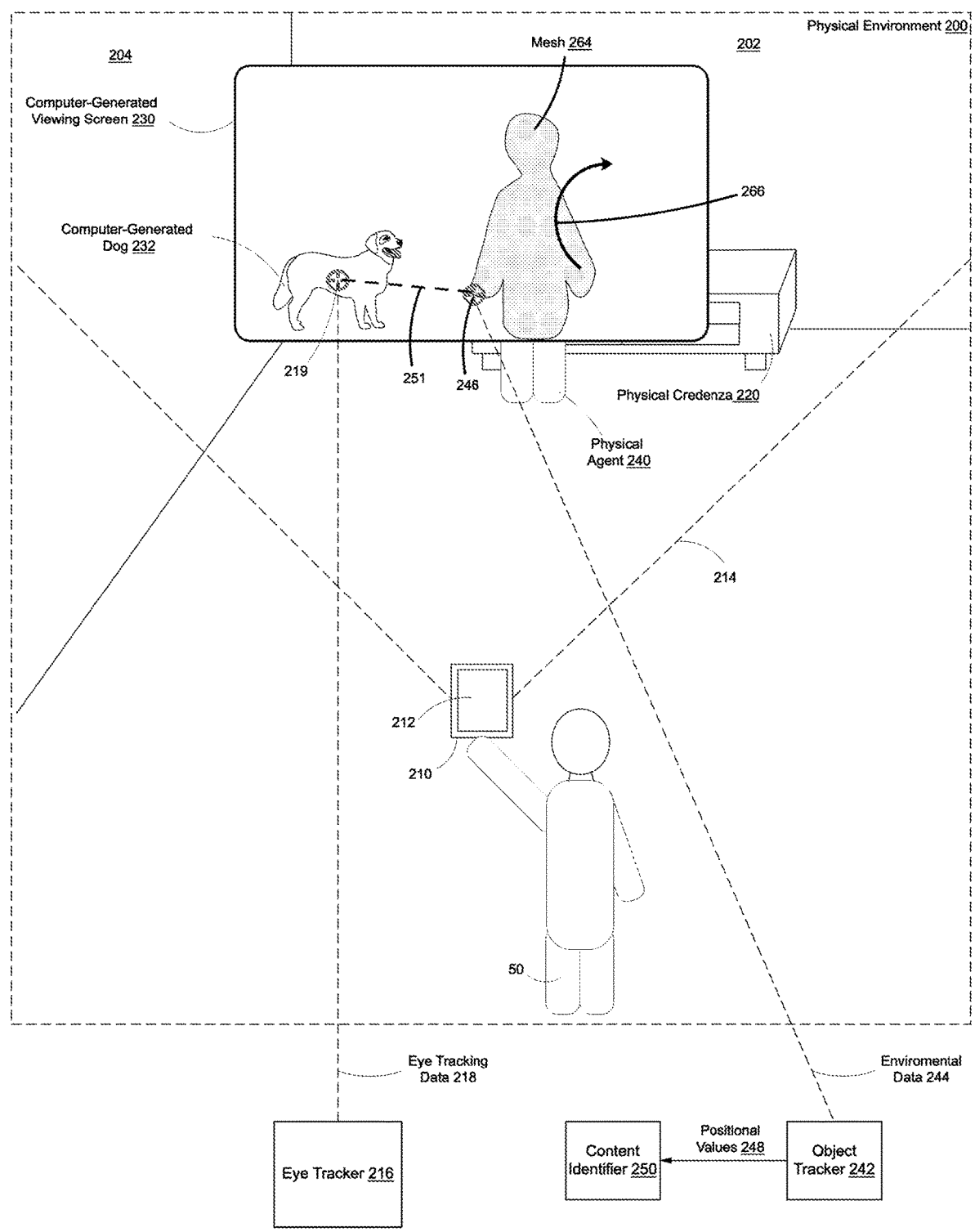
Figure 2J:
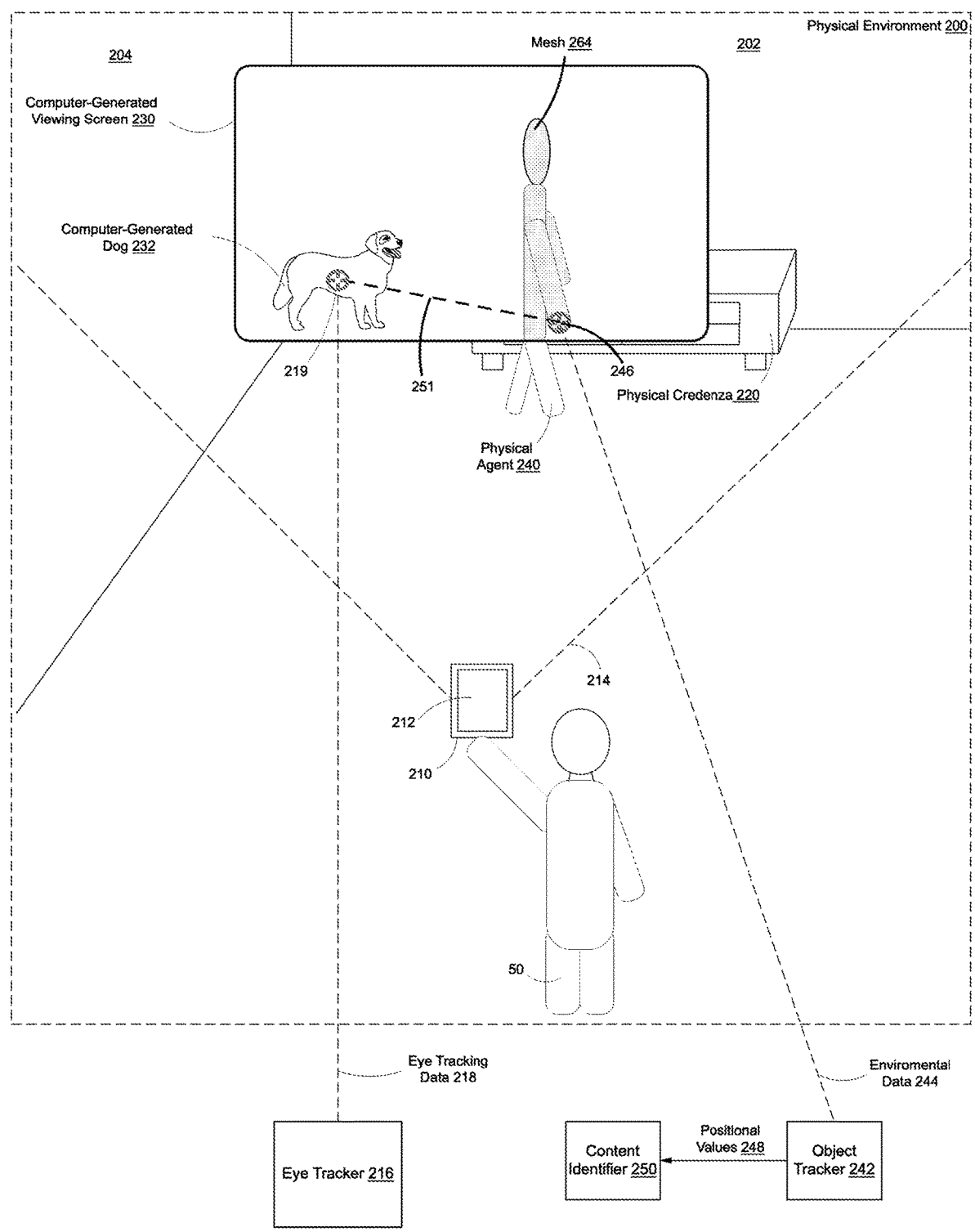

As illustrated in FIG. 2I, the physical agent 240 rotates in order to face away from the second wall 204, as indicated by rotational indicator 266. Based on the rotation, the object tracker 242 determines an updated plurality of positional values 248 based on the environmental data 244, and the electronic device 210 correspondingly updates the mesh 264. Namely, as illustrated in FIG. 2J, the updated mesh 264 has an orientation that reflects the rotation of the physical agent 240.

Figure 2K:
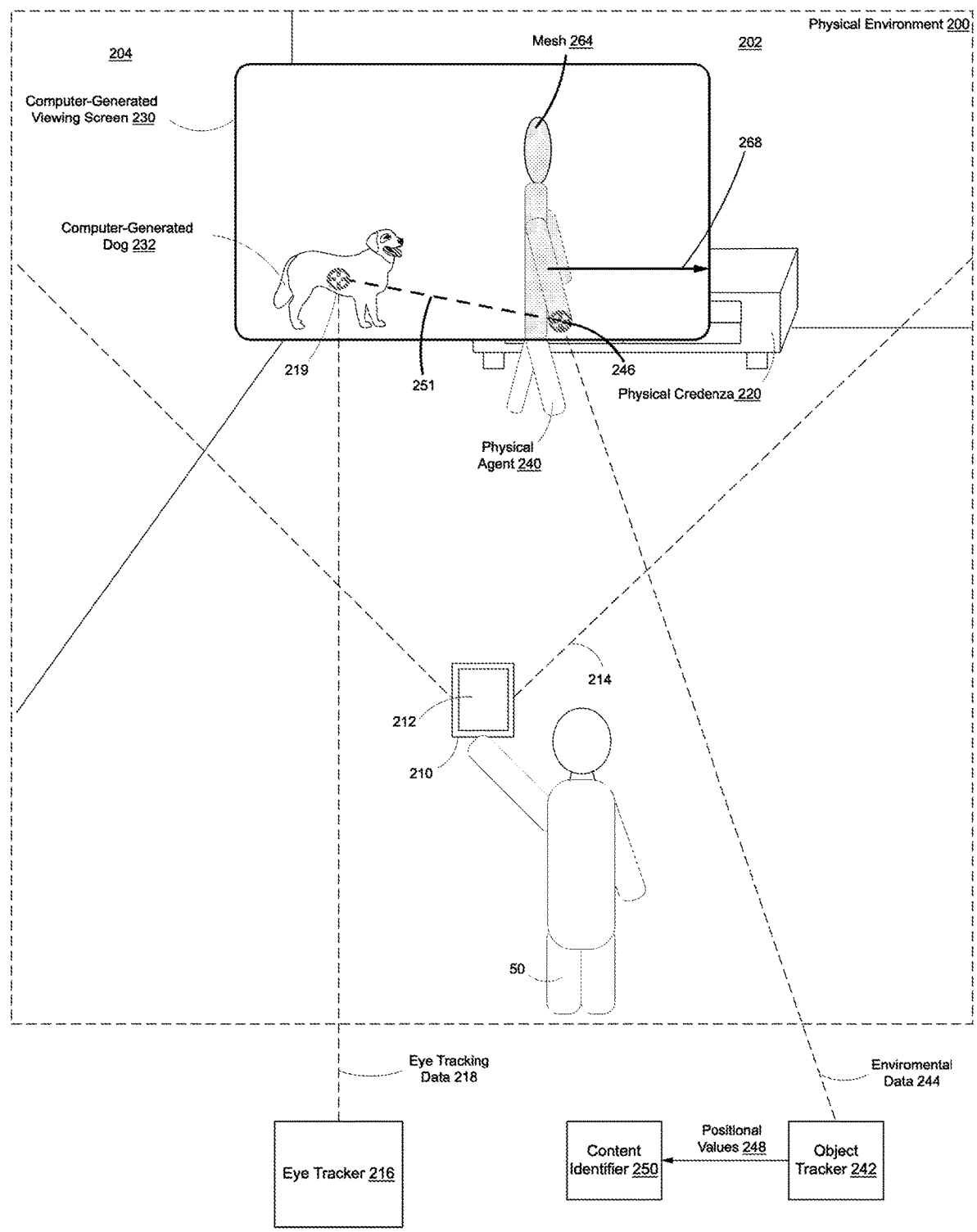
Figure 2L:
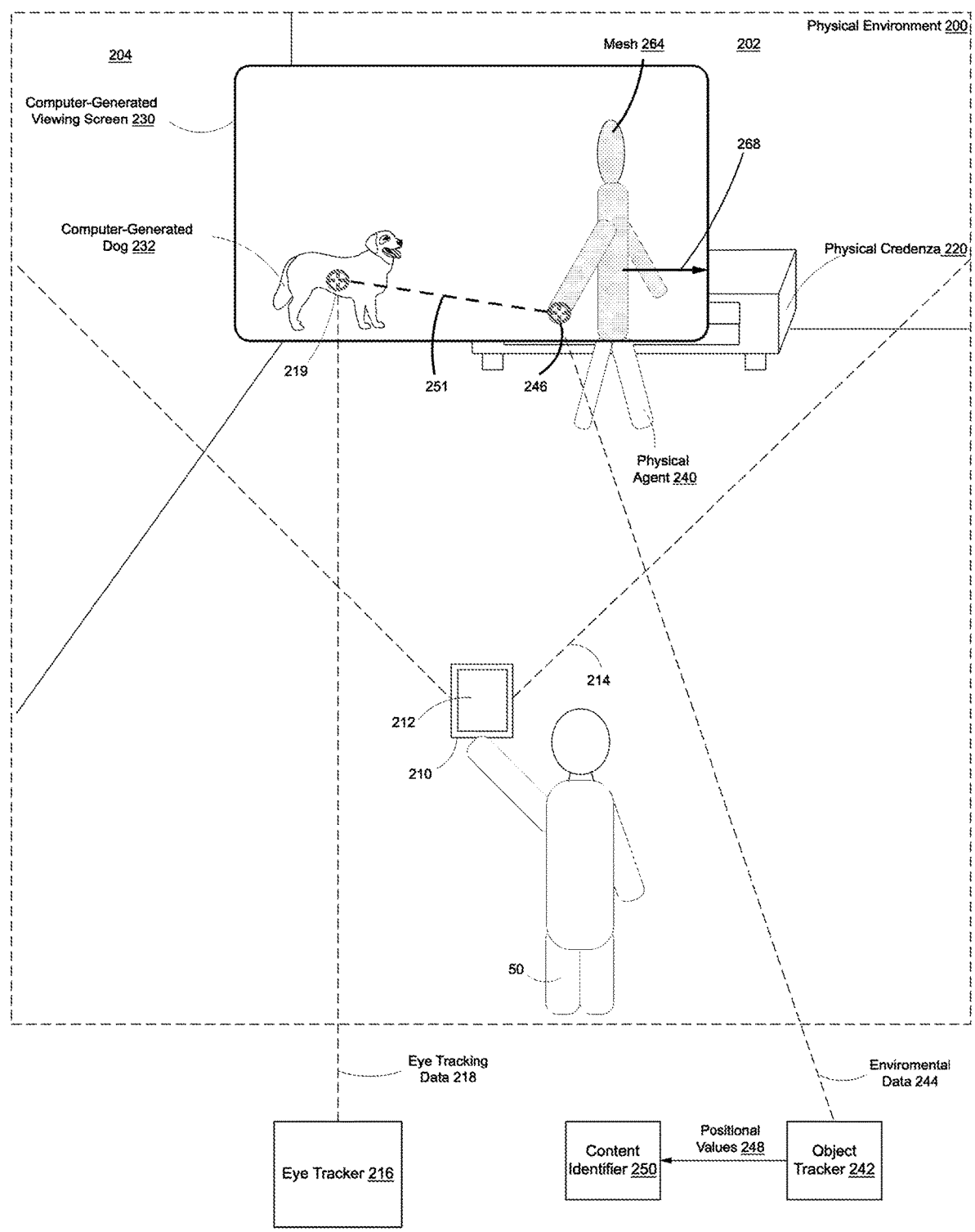

As illustrated in FIG. 2K, the physical agent 240 begins walking away from the second wall 204, as indicated by a second movement line 268. As the physical agent 240 walks, the object tracker 242 determines an updated plurality of positional values 248 based on the environmental data 244, and the electronic device 210 correspondingly updates the mesh 264, as illustrated in FIG. 2L.

Figure 2M:
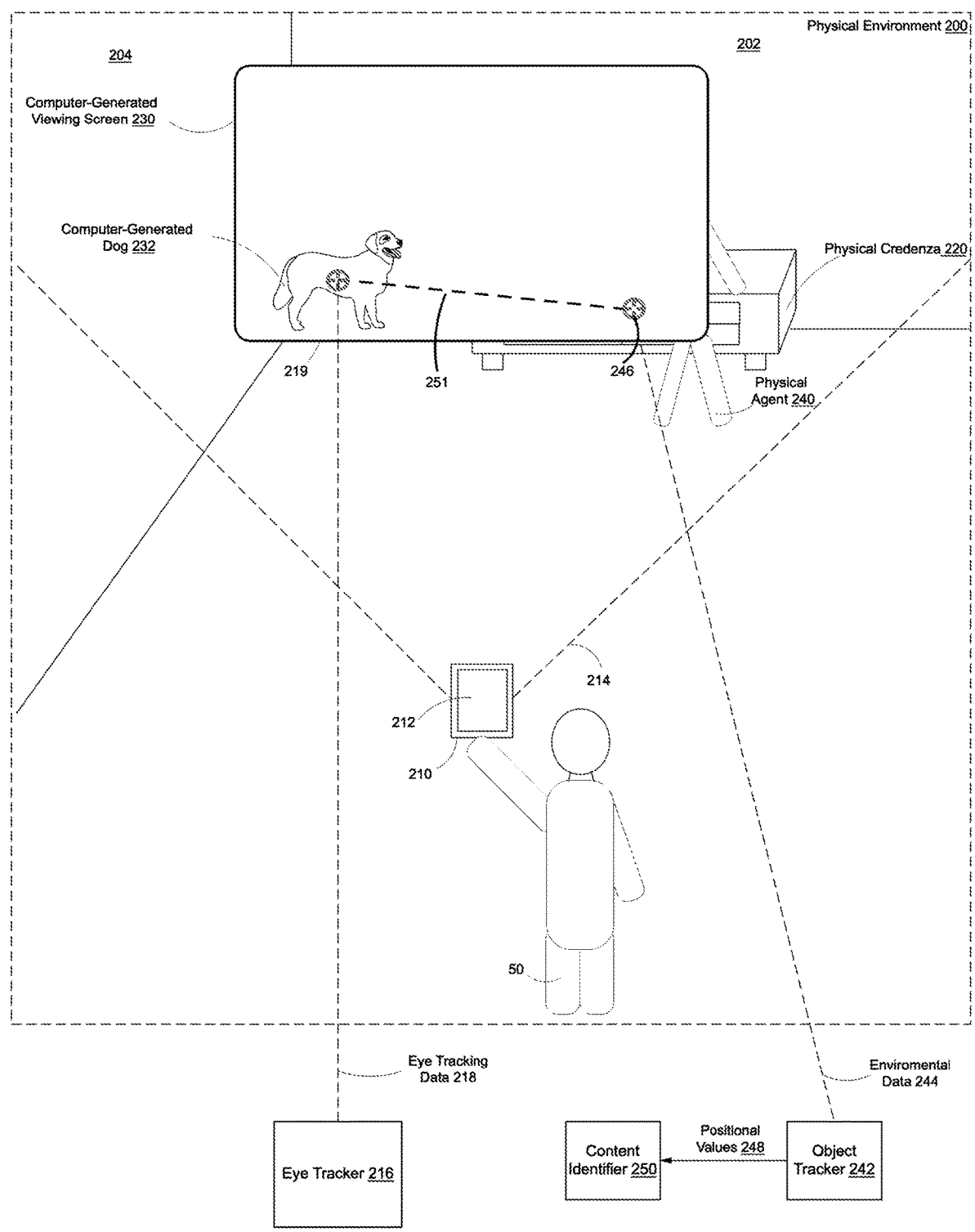

As illustrated in FIG. 2M, the physical agent 240 finishes walking, and the electronic device 210 determines an updated plurality of positional values 248 based on the environmental data 244. In some implementations, the electronic device 210 determines, based on the updated plurality of positional values 248, that the gaze position does not satisfy the proximity threshold because the distance between the gaze position and the portion of the physical agent 240 is greater than a threshold amount. Accordingly, as illustrated in FIG. 2M, the electronic device 210 ceases to display the mesh 264. Thus, in some circumstances, the electronic device 210 saves processing resources by not persistently displaying the object indicator (e.g., the mesh 264). Another example of resource savings is illustrated in FIG. 2D, wherein, although the object tracker 242 identifies a portion of the physical agent 240, the electronic device 210 does not display an object indicator because the occlusion criterion is not satisfied.

Figure 3:
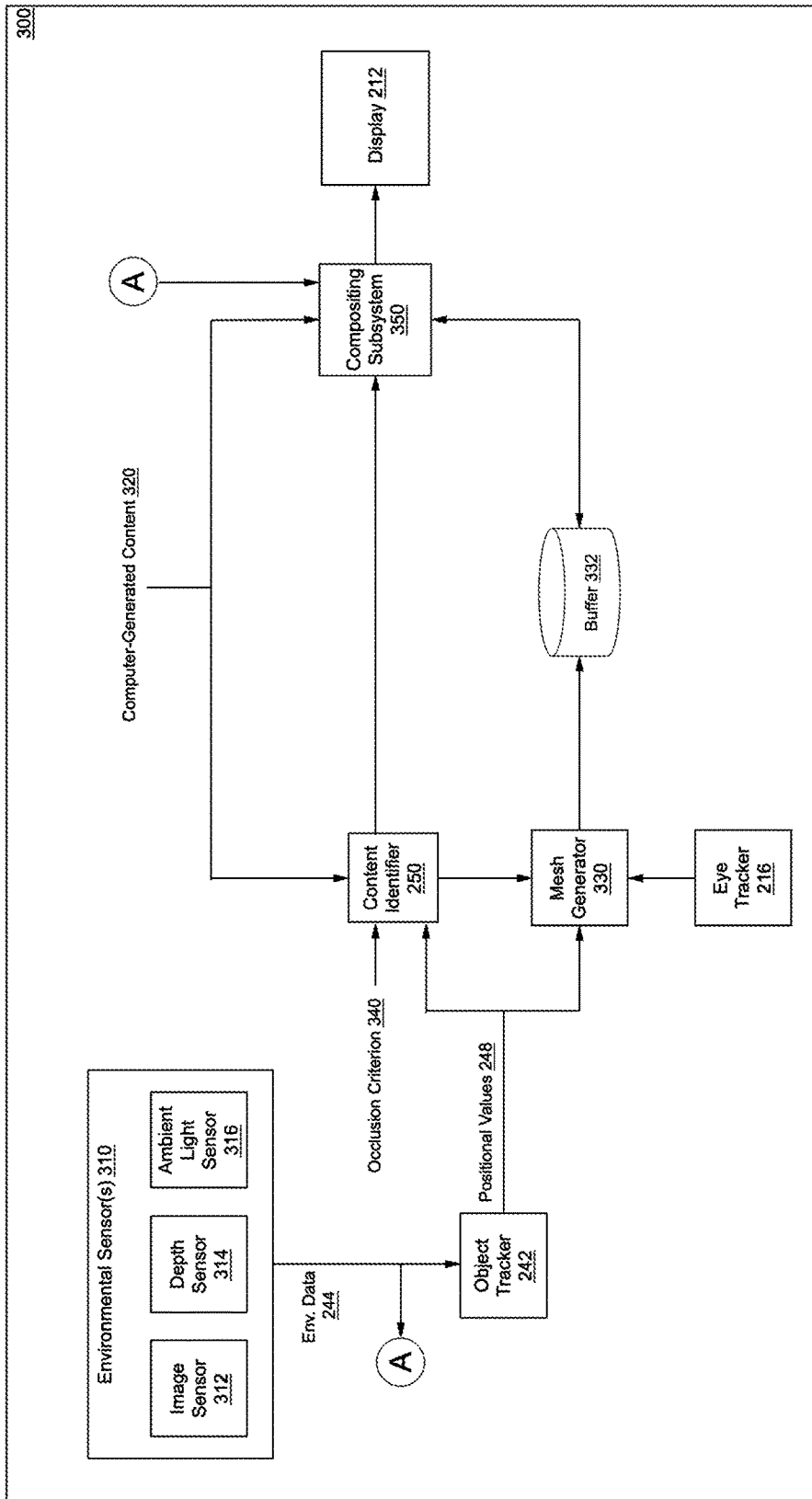
FIG. 3 is an example of a block diagram of a system that generates and displays a mesh corresponding to an occluded portion of a physical object in accordance with some implementations.

FIG. 3 is an example of a block diagram of a system 300 that generates and displays a mesh corresponding to an occluded portion of a physical object in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In some implementations, the system 300 or portions thereof are integrated in an electronic device, such as the electronic device 210 described with reference to FIGS. 2A-2M.

In order to track the physical object, the system 300 includes the object tracker 242. The object tracker 242 determines the plurality of positional values 248 associated with a physical object, based on a function of the environmental data 244. To that end, the system 300 includes one or more environmental sensors 310 that output the environmental data 244. For example, the environmental sensor(s) 310 include a combination of an image sensor (e.g., a camera) 312, a depth sensor 314, and an ambient light sensor 316. For example, the image sensor 312 outputs one or more images of a physical environment. Continuing with this example, the object tracker 242 identifies, within the image(s), a first set of one or more pixels associated with a first portion of a physical object, a second set of one or more pixels associated with a second portion of the physical object, etc. The object tracker 242 may utilize a computer-vision technique (optionally with the aid of a neural network) in order to identify the pixels of the image(s), such as instance segmentation or semantic segmentation. As another example, the depth sensor 314 outputs depth data associated with a physical environment. Continuing with this example, based on the depth data, the object tracker 242 identifies a first depth value associated with a first portion of a physical object, a second depth value associated with a second portion of the physical object, etc. As yet another example, the ambient light sensor 316 senses ambient light reflecting off of the physical object, and outputs corresponding ambient light data. Continuing with this example, based on the ambient light data, the object tracker 242 identifies a first ambient light value associated with a first portion of a physical object, a second ambient light value associated with a second portion of the physical object, etc.

In some implementations, the plurality of positional values 248 include positional values based on data from different environmental sensors. For example, the object tracker 242 determines a first one of the plurality of positional values 248 by identifying a first set of one or more pixels of image data from the image sensor 312, and determines a second one of the plurality of positional values 248 by identifying a first depth value based on depth data from the depth sensor 314. Continuing with this example, the first one of the plurality of positional values 248 and the second one of the plurality of positional values 248 may be associated with the same portion or different portions of the physical object.

The system 300 includes the content identifier 250. The content identifier 250 identifies a portion of computer-generated content 320 that satisfies an occlusion criterion 340 with respect to a corresponding portion of the physical object, based on the plurality of positional values 248. For example, with reference to FIG. 2B, the computer-generated content 320 includes a computer-generated viewing screen 230, which includes a computer-generated dog 232. As another example, the computer-generated content may be characterized by a static image or a video stream (e.g., series of images), and may be 2D or 3D content.

In some implementations, the occlusion criterion 340 is based on an opacity of the computer-generated content 320. For example, the content identifier 250 identifies a portion of computer-generated content 320 that satisfies the occlusion criterion 340 in part because the portion of computer-generated content 320 is associated with an opacity characteristic that exceeds a threshold, such as when a physical object is not viewable through the portion of the computer-generated content 320.

In some implementations, the occlusion criterion 340 is based on a position of the computer-generated content 320 relative to the physical object. For example, in some implementations, the content identifier 250 identifies a portion of the computer-generated content 320 that at least partially overlaps with the corresponding portion of the physical object. As one example, as illustrated in FIG. 2E, the content identifier 250 identifies, based on the plurality of positional values 248, a portion of the computer-generated viewing screen 230 that overlaps with a corresponding portion of (e.g., above the legs of) the physical agent 240. Continuing with this example, the plurality of positional values 248 may include a set of pixels of an image, from an image sensor, that represents the corresponding portion of the physical agent 240.

In some implementations, the occlusion criterion 340 is based on a depth of the computer-generated content 320 relative to a depth of a physical object. As one example, as illustrated in FIG. 2E, the plurality of positional values 248 includes one or more depth values associated with the portion of the physical agent 240. Thus, the content identifier 250 identifies a portion of the computer-generated viewing screen 230 that satisfies the occlusion criterion 340, because the portion of the computer-generated viewing screen 230 is associated with a first depth value that is less than the one or more depth values associated with the portion of the physical agent 240. In other words, the portion of the computer-generated viewing screen 230 is closer to the electronic device 210 than is the portion of the physical agent 240.

On other hand, at a given time the depth value(s) associated with a portion of a physical agent may be less than a depth value associated with a computer-generated viewing screen. For example, from the perspective of a user viewing a display, the portion of the physical agent is in front of the computer-generated viewing screen. In some implementations, based on the physical agent being in front of the computer-generated viewing screen, an electronic device displays the portion of the physical agent occluding a corresponding portion of the computer-generated viewing screen. Moreover, the electronic device may generate a mesh without an elongated bubble, with the mesh following the silhouette (e.g., profile) of the physical agent. Accordingly, the mesh may function to make the corresponding portion of the computer-generated viewing screen transparent, such that the physical agent appears to be realistically occluding the corresponding portion of the computer-generated viewing screen.

In some implementations, the occlusion criterion 340 is based on a combination of relative positions and relative depths. For example, with reference to FIG. 2D, although the first depth value associated with the computer-generated content is less than the one or more depth values associated with the portion of the physical agent 240, the occlusion criterion 340 is not satisfied because there is no positional overlap between the computer-generated content and the portion of the physical agent 240. As a counterexample, with reference to FIG. 2E, the occlusion criterion 340 is satisfied because the computer-generated content overlaps with the portion of the physical agent 240.

In some implementations, in response to identifying the portion of computer-generated content 320 that satisfies the occlusion criterion 340, the content identifier 250 instructs a mesh generator 330 to generate a mesh. The mesh indicates the corresponding portion of the physical object, and the mesh overlaps the portion of the computer-generated content. For example, the mesh corresponds to the mesh 263 described with reference to FIG. 2G or the mesh 264 described with reference to FIGS. 2H-2M.

In some implementations, the mesh generator 330 selectively generates the mesh. For example, when the content identifier 250 does not identify the portion of computer-generated content 320 that satisfies the occlusion criterion 340 (e.g., as illustrated in FIG. 2D), the content identifier 250 instructs the mesh generator 330 to not generate the mesh. As another example, in implementations including the eye tracker 216 (e.g., described with reference to FIGS. 2A-2M), generation of the mesh may be a function of eye tracking data from the eye tracker 216. For example, based on the gaze position indicated within the eye tracking data, the mesh generator 330 determines whether or not the gaze position satisfies a proximity threshold with respect to the identified portion of the computer-generated content 320. In some implementations, the mesh generator 330 generates the mesh in response to determining that the gaze position satisfies the proximity threshold (e.g., illustrated in FIG. 2L), and foregoes generating the mesh in response to determining that the gaze position does not satisfy the proximity threshold (e.g., illustrated in FIG. 2M). Accordingly, the system 300 reduces resource utilization by avoiding persistently generating the mesh.

In some implementations, the system 300 includes a buffer 332 for storing the mesh. To that end, the system 300 stores the mesh from the mesh generator 330 in the buffer 332. The buffer 332 may correspond to one of a cache, a random-access memory (RAM), etc. For example, the electronic device 210 includes a non-transitory memory that corresponds to the buffer 332, and the electronic device 210 stores the mesh 264 in the non-transitory memory.

In some implementations, the system 300 includes a compositing subsystem 350. According to various implementations, the system 300 provides the mesh from the buffer 332 to the compositing subsystem 350, which, in turn, composites the mesh with the environmental data 244 and the computer-generated 320. For example, in response to receiving a mesh request from the compositing subsystem 350, the system 300 retrieves the mesh from the buffer 332 and provides the mesh to the compositing subsystem 350. The request may originate from the content identifier 250 when the content identifier 250 identifies the portion of the computer-generated content 320 that satisfies the occlusion criterion 340. The system 300 provides the output of the compositing subsystem 350 to the display 212 for display. Accordingly, the system 300 uses a common memory (e.g., the buffer 332) for mesh storage and mesh retrieval during compositing. The compositing subsystem 350, thus, composites the mesh with less latency and while using fewer computational resources, as compared with storing the mesh in a first memory during mesh generation, copying the mesh from the first memory to a second memory, and retrieving the mesh from the second memory during compositing.

In some implementations, the compositing subsystem 350 performs alpha compositing (e.g., alpha blending), based on a mesh and the computer-generated content 320, in order to make the create the appearance of partial or full transparency. For example, with reference to 2G, the compositing subsystem 350 alpha blends a portion of the physical agent 240 (e.g., captured by a camera) and a corresponding portion of the computer-generated 320 such that the corresponding portion of the computer-generated 320 appears partially or wholly transparent in view of the portion of the physical agent 240.

Figure 4:
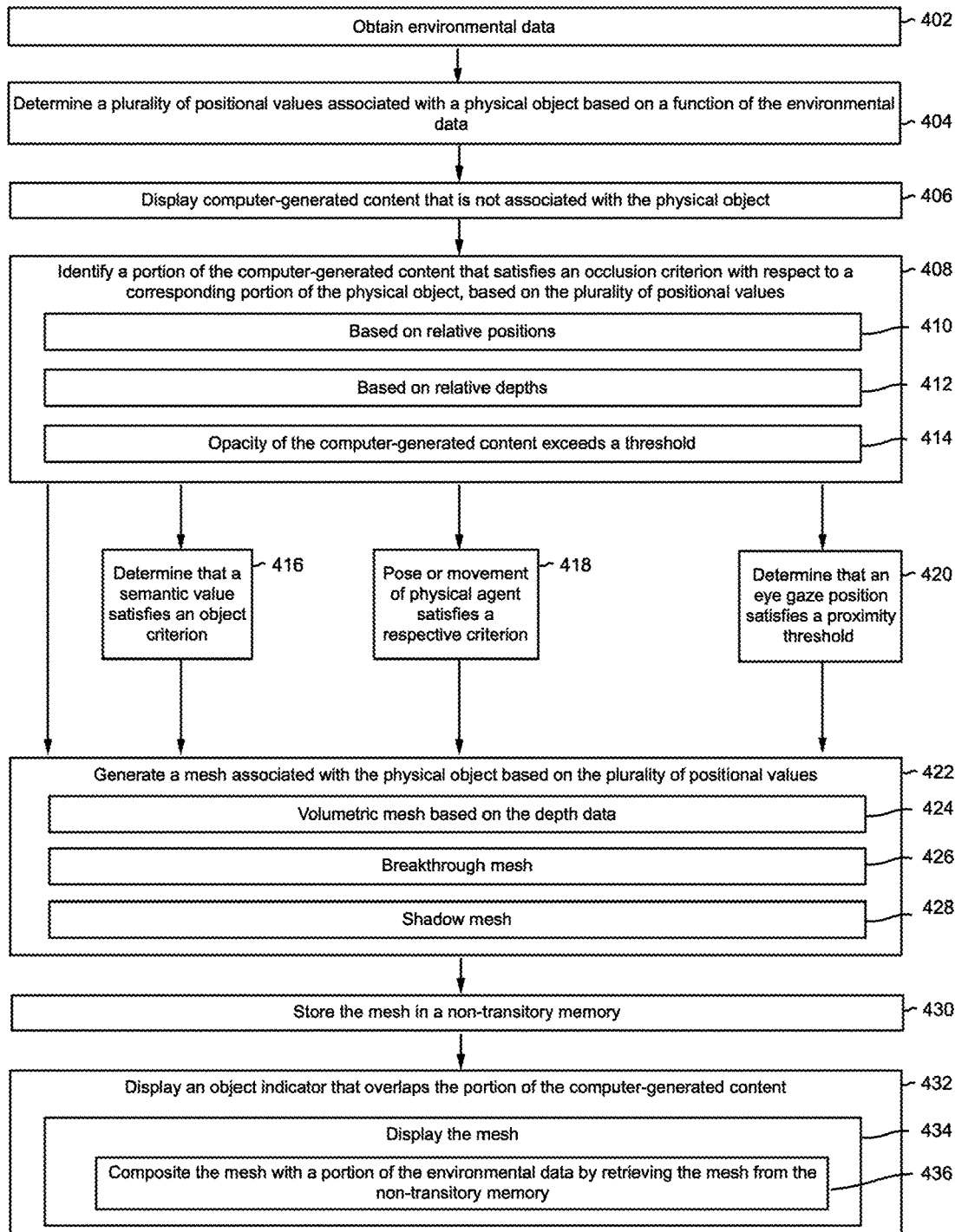
FIG. 4 is an example of a flow diagram of a method of displaying an object indicator indicating an occluded portion of a physical object in accordance with some implementations.

FIG. 4 is an example of a flow diagram of a method 400 of displaying an object indicator indicating an occluded portion of a physical object in accordance with some implementations. In various implementations, the method 400 or portions thereof are performed by an electronic device (e.g., the electronic device 100 in FIG. 1 or the electronic device 210 in FIGS. 2A-2M). In various implementations, the method 400 or portions thereof are performed by the system 300. In various implementations, the method 400 or portions thereof are performed by a mobile device, such as a smartphone, tablet, or wearable device. In various implementations, the method 400 or portions thereof are performed by a head-mountable device (HMD) including a display. In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 402, in some implementations, the method 400 includes obtaining environmental data from one or more environmental sensors. For example, with reference to FIG. 3, the environmental sensor(s) include a combination of the image sensor 312, the depth sensor 314, and the ambient light sensor 316. Other examples of environmental sensors include an inertial measurement unit (IMU), simultaneous localization and mapping (SLAM) sensor, and a visual inertial odometry (VIO) sensor. The environmental data may be based on a function of current viewable region associated with a respective sensor. For example, with reference to FIG. 2A, an image sensor, which is integrated in the electronic device 210, has a pose that approximately corresponds to the viewable region 214 associated with the display 212. Accordingly, image data from the image sensor includes respective representations of the first wall 202, the second wall 204, and the physical credenza 220.

As represented by block 404, the method 400 includes determining a plurality of positional values associated with a physical object based on a function of the environmental data. The plurality of positional values are respectively associated with a plurality of positions of the physical object. The physical object may correspond to any type of physical (e.g., real-world) object, such as a physical agent (e.g., a person, animal, or robot) or an inanimate physical article (e.g., a stapler sitting on a table). As one example, with reference to FIG. 2E, the object tracker 242 determines a first positional value (indicated by the second reticle 246) associated with the right hand of the physical agent 240, a second positional value (not shown) associated with the left hand of the physical agent 240, a third positional value (not shown) associated with the face of the physical agent 240, etc. The plurality of positional values may include a combination of a set of pixels (within image data from an image sensor), one or more depth values (within depth data from a depth sensor), and one or more ambient light values (within ambient light data from an ambient light sensor). In various implementations, the method 400 includes determining the plurality of positional values by applying a computer-vision technique to the environmental data, such as instance segmentation or semantic segmentation.

As represented by block 406, in some implementations, the method 400 includes displaying computer-generated content. For example, with reference to FIG. 2B, the electronic device 210 displays, on the display 212, a computer-generated viewing screen 230 and a computer-generated dog 232.

In some implementations, the computer-generated content is not associated with the physical object, such as when display of the computer-generated content is independent of the physical object. In other words, the presence of the physical object within a viewable region provided by the display does not affect the computer-generated content.

As represented by block 408, the method 400 includes identifying a portion of the computer-generated content that satisfies an occlusion criterion with respect to a corresponding portion of the physical object, based on at least a portion of the plurality of positional values. For example, the portion of the computer-generated content occludes the corresponding portion of the physical object, and the corresponding portion of the physical object would be viewable but for display of the portion of the computer-generated content.

As represented by block 410, in some implementations, the occlusion criterion is based on a position of the computer-generated content relative to the position of the physical object. To that end, in some implementations, the method 400 includes identifying a portion of the computer-generated content 320 that at least partially overlaps with the corresponding portion of the physical object. As one example, as illustrated in FIG. 2E, the content identifier 250 identifies, based on the plurality of positional values 248, a portion of the computer-generated viewing screen 230 that overlaps with a corresponding portion of (e.g., above the legs of) the physical agent 240. In the previous example, the plurality of positional values 248 may include a set of pixels of an image, from an image sensor, that represents the corresponding portion of the physical agent 240.

As represented by block 412, in some implementations, the occlusion criterion is based on a depth of the computer-generated content relative to a depth of the physical object. As one example, as illustrated in FIG. 2E, the plurality of positional values 248 includes one or more depth values associated with the portion of the physical agent 240. Thus, the content identifier 250 identifies a portion of the computer-generated viewing screen 230 that satisfies the occlusion criterion 340, because the portion of the computer-generated viewing screen 230 is associated with a first depth value that is less than the one or more depth values associated with the portion of the physical agent 240.

As represented by block 414, in some implementations, the occlusion criterion is based in part on an opacity associated with the computer-generated content. For example, with reference to FIG. 2E, the content identifier 250 identifies a portion of computer-generated viewing screen 230 that satisfies the occlusion criterion 340 because the portion of computer-generated viewing screen 230 is associated with an opacity characteristic that exceeds a threshold. Accordingly, a corresponding portion of the physical agent 240 is not viewable on the display through the portion of the computer-generated viewing screen 230.

In some implementations, the occlusion criterion is based on a combination of relative positions, relative depths, and the opacity associated with the computer-generated content.

As represented by block 416, in some implementations, the method 400 includes determining a semantic value associated with the physical object satisfies an object criterion. To that end, the method 400 includes obtaining the semantic value, such as by performing semantic segmentation with respect to image data from an image sensor (e.g., the image sensor 312 in FIG. 3). In some implementations, the semantic value satisfies the object criterion when the semantic value is indicative of a physical agent, such as a person, animal, or robot. In some implementations, the semantic value satisfies the object criterion when the semantic value is indicative of a predefined object type, such as a trending or popular object type. For example, the predefined object type is specified via a user input (e.g., a text string). In some implementations, in response to determining that the semantic value satisfies the object criterion, the method 400 proceeds to a portion of the method 400 represented by block 422, which will be discussed below.

As represented by block 418, in some implementations, when the physical object corresponds to a physical agent, the method 400 includes determining whether the physical agent satisfies a pose criterion or a movement criterion. To those ends, the method 400 includes determining a pose characteristic associated with the physical agent or detecting a movement characteristic associated with the physical agent, based on the environmental data. For example, the method 400 includes determining that the physical agent satisfies the pose criterion when the pose characteristic indicates that the physical agent is facing the device—e.g., semantic segmentation output value is "face" or "eyes." As another example, the method 400 includes determining that the physical agent satisfies the movement criterion when the movement characteristic indicates that an arm of the physical agent is waving. In some implementations, in response to determining that the physical agent satisfies the pose criterion or the movement criterion, the method 400 proceeds to a portion of the method 400 represented by block 422, which will be discussed below.

As represented by block 420, in some implementations, the method 400 includes determining that a gaze position satisfies a proximity threshold with respect to the portion of the computer-generated content. For example, with reference to FIG. 2E, the eye tracker 216 outputs the eye tracking data 218 indicating the gaze position of the user 50. Moreover, the electronic device 210 determines that the gaze position satisfies the proximity threshold because the distance represented by the distance line 251 between the gaze position and the identified portion of the computer-generated viewing screen 230 is less than a threshold. Accordingly, the electronic device 210 displays, on the display 212, the object indicator (e.g., the outline 262 in FIG. 2F and the mesh 264 in FIG. 2H). As a counterexample, with reference to FIG. 2M, the electronic device 210 ceases to display the mesh 264 because the distance represented by the distance line 251 ceases to be less than the threshold. In some implementations, in response to determining that the gaze position satisfies the proximity threshold, the method 400 proceeds to a portion of the method 400 represented by block 422, which will be discussed below.

As represented by block 422, in some implementations, the method 400 includes generating a mesh associated with the physical object based on the plurality of positional values. Accordingly, the method 400 may include using the outputs of blocks 416, 418, and/or 420 to determine whether or not to generate a mesh, thereby enabling optimization and resource savings. In some implementations, generating the mesh is in response to identifying the portion of the computer-generated content that satisfies the occlusion criterion. Accordingly, an electronic device or system performing the method 400 may selectively generate a mesh, thereby avoiding resource utilization when generating the mesh is not appropriate. With reference to FIG. 3, the mesh generator 330 may generate a mesh based on the plurality of positional values 248. As represented by block 424, in some implementations, the mesh corresponds to a volumetric (e.g., 3D) mesh. To that end, in some implementations, the method 400 includes obtaining a plurality of depth values within depth data from a depth sensor, and generating the volumetric mesh based at least in part on the plurality of depth values. In some implementations, the method 400 includes applying a contour polygon function (e.g., a marching squares function) with respect to image data representing the physical object, in order to generate the mesh.

As represented by block 426, in some implementations, the mesh enables breakthrough with respect to the computer-generated content. For example, with reference to FIG. 2G, the mesh 263, when composited when the corresponding portion of the computer-generated viewing screen 230, makes the physical agent 240 viewable on the display 212. For example, in some implementations, the method 400 includes utilizing alpha blending in order to generate apparent transparency with respect to the computer-generated content.

As represented by block 428, in some implementations, the mesh indicates a shadow that is associated with the physical agent. For example, with reference to FIG. 2H, the mesh 264 indicates a shadow of the physical agent 240, without indicating features (e.g., eyes, nose) of the physical agent 240. In some implementations, the darkness of the shadow is based on the depth of the computer-generated content relative to the depth of the physical object. For example, with reference to FIG. 2H, as the physical agent 240 moves closer to the computer-generated viewing screen 230 (e.g., decreasing difference between respective depth values), the shadow associated with the mesh 264 becomes darker, and vice versa as the physical agent 240 moves away from the computer-generated viewing screen 230. In some implementations, when the difference between the respective depth values is more than a threshold amount, the method 400 includes ceasing to display the shadow mesh. For example, when a physical agent is a substantial distance behind the computer-generated content (from the perspective of a user viewing the display), then it is unlikely that the physical agent is attempting to get the attention of the user. Accordingly, displaying the shadow in this case is not likely helpful to the user.

As represented by block 430, in some implementations, the method 400 includes storing the mesh in a non-transitory memory. For example, an electronic device performing the method 400 includes the non-transitory memory, and stores the mesh in the non-transitory memory. As another example, with reference to FIG. 3, the system 300 stores the mesh from the mesh generator 330 in the buffer 332.

As represented by block 432, the method 400 includes displaying an object indicator that indicates the corresponding portion of the physical object. The object indicator overlaps the portion of the computer-generated content. In some implementations, the method 400 includes displaying the object indicator in response to identifying the portion of the computer-generated content that satisfies the occlusion criterion, represented by block 408. The object indicator indicates the position of the physical object within a physical environment.

In some implementations, displaying the object indicator corresponds to displaying an outline overlaid onto the portion of the computer-generated content, such as the outline 262 illustrated in FIG. 2F. To that end, the method 400 includes determining the outline associated with the corresponding portion of the physical object based on the plurality of positional values. In some implementations, the outline overlay satisfies a color contrast threshold and/or luminance contrast threshold with respect to the portion of the computer-generated content such that the outline is readily viewable overlaid on the portion of the computer-generated content.

In some implementations, displaying the object indicator corresponds to increasing a transparency characteristic associated with the portion of the computer-generated content in order to make the corresponding portion of the physical agent viewable on the display. For example, the method 400 includes applying a mask to the portion of the computer-generated content. A compositing subsystem (e.g., the compositing subsystem 350) may apply the mask.

As represented by block 434, in some implementations, the method 400 includes displaying the mesh as the object indicator, such as the mesh 263 illustrated in FIG. 2G or the mesh 264 illustrated in FIG. 2H. To that end, in some implementations, as represented by block 436, the method 400 includes compositing (e.g., via the compositing subsystem 350) the mesh with a portion of the environmental data that is associated with the physical object. Compositing includes retrieving the mesh from the non-transitory memory. Accordingly, the method 400 utilizes a common non-transitory memory for mesh storage during mesh generation and for mesh retrieval during compositing, thereby reducing latency and computational expenses.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed:

1. A method comprising:
at an electronic device including one or more processors, a non-transitory memory, one or more environmental sensors, and a display:
displaying computer-generated content on the display;
determining a plurality of positional values associated with a physical object based on environmental data from the one or more environmental sensors;
identifying a portion of the computer-generated content that satisfies an occlusion criterion with respect to a corresponding portion of the physical object, based on the plurality of positional values indicating the computer-generated content is between the physical object and the user; and
in response to identifying that the occlusion criterion is satisfied:
generating a mesh associated with the physical object based on the plurality of positional values; and
displaying the mesh on the display, wherein the mesh overlaps with the portion of the computer-generated content.

2. The method of claim 1, wherein displaying the mesh corresponds to increasing a transparency characteristic associated with the portion of the computer-generated content.

3. The method of claim 1, wherein the mesh indicates a shadow that is associated with the physical object.

4. The method of claim 1, the method further comprising storing the mesh in the non-transitory memory, wherein displaying the mesh includes compositing the mesh with a portion of the environmental data that is associated with the physical object, and wherein the compositing includes retrieving the mesh from the non-transitory memory.

5. The method of claim 1, wherein the plurality of positional values includes a first positional value indicating a depth value.

6. The method of claim 5, wherein identifying that the occlusion criterion is satisfied includes:
   determining that the portion of the computer-generated content at least partially overlaps with the corresponding portion of the physical object on the display, based on at least a portion of the plurality of positional values including the first positional value indicating the depth value; and
   determining that the portion of the computer-generated content is associated with a respective depth value that is less than a respective depth value associated with the physical object, based on at least a portion of the plurality of positional values including the first positional value indicating the depth value.

7. The method of claim 5, wherein the one or more environmental sensors include a depth sensor that outputs depth data, wherein the plurality of positional values includes a plurality of depth values based on the depth data, the depth value characterizing the physical agent, and wherein the mesh corresponds to a volumetric mesh that is based on the plurality of depth values.

8. The method of claim 1, wherein identifying that the occlusion criterion is satisfied includes determining that the portion of the computer-generated content is associated with an opacity characteristic that exceeds a threshold.

9. The method of claim 1, further comprising:
   obtaining a semantic value that is associated with the physical object based on the environmental data; and
   determining that the semantic value satisfies an object criterion;
   wherein generating the mesh is in further response to determining that the semantic value satisfies the object criterion.

10. The method of claim 9, wherein the semantic value satisfies the object criterion when the semantic value is indicative of a physical agent.

11. The method of claim 9, wherein the semantic value satisfies the object criterion when the semantic value is indicative of a predefined object type.

12. The method of claim 1, wherein the physical object corresponds to a physical agent, the method further comprising determining a pose characteristic associated with the physical agent based on the environmental data, wherein generating the mesh is in further response to determining that the pose characteristic satisfies a pose criterion.

13. The method of claim 1, wherein the physical object corresponds to a physical agent, the method further comprising detecting a movement characteristic associated with the physical agent based on the environmental data, wherein generating the mesh is in further response to determining that the movement characteristic satisfies a movement criterion.

14. The method of claim 1, wherein the electronic device includes an eye tracker that outputs eye tracking data, wherein the eye tracking data indicates a gaze position of a user, and wherein generating the mesh is in further response to determining that the gaze position satisfies a proximity threshold with respect to the portion of the computer-generated content.

15. The method of claim 1, further comprising determining an outline associated with the corresponding portion of the physical object based on the plurality of positional values, wherein generating the mesh is based on the outline.

16. The method of claim 1, wherein the one or more environmental sensors include an image sensor that outputs image data, and wherein the image data represents the physical object.

17. The method of claim 1, wherein the one or more environmental sensors include an ambient light sensor that senses ambient light from a physical environment and outputs corresponding ambient light data, and wherein the corresponding ambient light data is associated with the physical object.

18. The method of claim 1, wherein the one or more environmental sensors include a depth sensor that outputs depth sensor data, and wherein the depth sensor data indicates one or more depth values that are associated with the physical object.

19. A system comprising:
   one or more environmental sensors;
   an object tracker to determine a plurality of positional values associated with a physical object based on environmental data from the one or more environmental sensors;
   a content identifier to identify a portion of the computer-generated content that satisfies an occlusion criterion with respect to a corresponding portion of the physical object, based on the plurality of positional values indicating the computer-generated content is between the physical object and the user; and
   a mesh generator to generate a mesh associated with the physical object based on the plurality of positional values, wherein the mesh generator generates the mesh based on the content identifier identifying the portion of computer-generated content that satisfies the occlusion criterion; and
   a display to display the mesh overlapping with the portion of the computer-generated content.

20. A non-transitory computer readable storage medium storing one or more programs, the one or more programs comprising instructions, which, when executed by an electronic device with one or processors, one or more environmental sensors, and a display, cause the electronic device to:
   display computer-generated content on the display;
   determine a plurality of positional values associated with a physical object based on environmental data from the one or more environmental sensors;
   identify a portion of the computer-generated content that satisfies an occlusion criterion with respect to a corresponding portion of the physical object, based on the plurality of positional values indicating the computer-generated content is between the physical object and the user; and
   in response to identifying that the occlusion criterion is satisfied:
      generate a mesh associated with the physical object based on the plurality of positional values; and
      display the mesh on the display, wherein the mesh overlaps with the portion of the computer-generated content.

* * * * *